(12) United States Patent
Shimada et al.

(10) Patent No.: US 6,325,166 B1
(45) Date of Patent: Dec. 4, 2001

(54) HYDRAULIC TRAVELLING AGRICULTURAL MACHINE

(75) Inventors: Takanobu Shimada; Katsumi Fujiki; Kouichi Hiroshige, all of Okayama (JP)

(73) Assignees: Yanmar Agricultural Equipment Co., Ltd., Osaka; Seirei Industry Co., Ltd., Okayama, both of (JP)

(*) Notice: Subject to any disclaimer, the term of this patent is extended or adjusted under 35 U.S.C. 154(b) by 0 days.

(21) Appl. No.: 09/202,462

(22) PCT Filed: Sep. 13, 1996

(86) PCT No.: PCT/JP96/02649

§ 371 Date: Dec. 14, 1998

§ 102(e) Date: Dec. 14, 1998

(87) PCT Pub. No.: WO98/10972

PCT Pub. Date: Mar. 19, 1998

(51) Int. Cl.$^7$ .................................................... B62D 11/04
(52) U.S. Cl. .................. 180/6.48; 180/6.7; 180/6.32; 74/473.11; 74/473.3
(58) Field of Search .................................. 180/6.48, 6.2, 180/6.3, 6.7, 6.32, 403; 74/469, 473.11, 473.3, 490.14

(56) References Cited

U.S. PATENT DOCUMENTS

| | | |
|---|---|---|
| 2,015,886 | 10/1935 | Eberhard . |
| 3,599,741 * | 8/1971 | Langford ............................ 180/6.48 |
| 3,876,020 * | 4/1975 | Barsby ............................... 180/6.48 |
| 3,882,679 | 5/1975 | Williamson . |
| 3,897,840 | 8/1975 | Molzahn et al. . |
| 3,898,811 * | 8/1975 | Seaberg ............................. 180/6.48 |
| 3,913,695 * | 10/1975 | Holdenried et al. ............... 180/6.48 |
| 3,995,426 * | 12/1976 | Habiger ......................... 180/6.48 X |
| 4,019,596 * | 4/1977 | Crull ................................. 180/6.48 |
| 4,023,636 * | 5/1977 | Levin ................................. 180/6.48 |
| 4,031,975 * | 6/1977 | Engel ................................. 180/6.48 |
| 4,310,078 * | 1/1982 | Shore ................................. 180/6.48 |
| 4,541,497 * | 9/1985 | Riediger et al. .................. 180/6.48 |
| 4,942,934 * | 7/1990 | Moriarty ........................... 180/6.48 |

FOREIGN PATENT DOCUMENTS

| | | |
|---|---|---|
| 55-52424 | 4/1980 | (JP) . |
| 1-282074 | 11/1989 | (JP) . |
| 4-1077 | 1/1992 | (JP) . |
| 4-113934 | 4/1992 | (JP) . |
| 07329818 | 12/1995 | (JP) . |

\* cited by examiner

Primary Examiner—J. J. Swann
Assistant Examiner—F. Zeender
(74) Attorney, Agent, or Firm—Jordan and Hamburg LLP

(57) ABSTRACT

In a hydraulic travelling agricultural machine which includes travelling sections, a pump operating unit is disposed in an operating section for controlling the steering and speed change of the travelling sections. The pump operating unit is connected interlockingly to a pair of varible flow rate control pumps via a link mechanism for a spool, and is operated by a steering mechanism and a speed changing mechanism. Accordingly, the natural vibration occurring in the variable flow rate control pumps is obsorbed by the link mechanisms, and hence the vibration transmitted to the pump operating unit is attenuated. The propagation of the vibration to the steering mechanism and the speed changing mechanism is thereby inhibited.

3 Claims, 23 Drawing Sheets

HYDRAULIC TRAVELLING AGRICULTURAL MACHINE

BACKGROUND TECHNOLOGY

The present invention relates to a hydraulic travelling agricultural machine with traveling sections of a crawler type.

BACKGROUND TECHNOLOGY

Hitherto, as a hydraulically travelling agricultural machine with traveling sections of a crawler type disposed on left-hand and right-hand sides so as to travel discretely, there is known a tractor, for example, which is disclosed in U.S. Pat. No. 2,015,886. The tractor is configured such that a pair of the traveling sections of the crawler type on the left-hand and right-hand sides are provided with hydraulic motors for traveling the left-hand and right-hand traveling sections, respectively, and a variable flow rate control pump is connected to each of the hydraulic motors via a closed circuit oil path to drive the respective hydraulic motors. A trunnion lever of each of the left-hand and right-hand variable flow rate control pumps is coupled with left-hand and right-hand bar-shaped operating levers disposed discretely, respectively, to implement the steering operation by moving each of the operating levers pivotally in a forward or backward direction.

Further, each of the two operating levers is elongated vertically in an axial direction so as to reduce an operating load.

Moreover, the tractor is configured such that a power pickup shaft is coupled with an output shaft of the engine via a decelerating shaft on which in turn are mounted a hydraulic clutch unit and a hydraulic brake device. To each of the hydraulic clutch unit and the hydraulic brake device is connected a pilot oil path for feeding pilot oil, and an oil path change-over valve is mounted on the pilot oil path at its intermediate portion. By shifting the oil path change-over valve, the hydraulic clutch unit implements the clutching action, while braking the hydraulic brake device, forcibly terminating the rotation of the power pickup shaft.

The tractor as disclosed in the prior art patent, however, poses the following disadvantages.

1. As the operating levers are disposed each in a long extended form, the inherent vibration of the variable flow rate control pump and the vibration of the machine upon traveling may be caused to propagate to the operating levers, thereby vibrating a gripping section disposed at an upper end portion of each operating lever in a large amplitude. As a result, there is the risk that the operator holding the gripping section may make a mistake in operating the machine. In this respect, the machine leads to a poor operability.

2. As each of the operating levers is in a long elongated form, the scope of the pivotal movement of each operating lever may become large so that a smooth turning operation becomes difficult.

3. When a pair of the variable flow rate control pumps are to be operated with the two discrete operating levers, the speed changing operation for shifting the traveling speed of the machine and the turning operation for steering the machine have to be effected with the identical operating lever so that the such operation may suffer from the difficulty in carrying out a smooth operation of the operating levers. Further, in the work requiring a repetition of forward and backward movements of the machine, there may be caused to occur the risk that the operator cannot recognize the neutral position during the speed changing operation, thereby causing a failure of appropriate operation and leading to an accident.

Moreover, the tractor may suffer from the difficulty that the operator may be unable to quickly deal with the demand, for instance, to narrow the scope of the speed changing operation even if the such demand would be made.

4. The prior art tractor is so configured that the clutching action of the hydraulic clutch unit and the braking action of the hydraulic brake device are to be done by a rapid flow of pilot oil into or out from the hydraulic clutch unit and the hydraulic brake device by the operation of shifting the oil path change-over valve. Thus, a large shock is caused to occur, thereby hindering a smooth operation of shifting the clutch of the hydraulic clutch unit and braking the hydraulic brake device.

Therefore, the present invention has the object to provide a hydraulically traveling agricultural machine that can solve the disadvantages and difficulties prevailing in the conventional machines.

SUMMARY OF THE INVENTION

The present invention provides a hydraulically traveling agricultural machine in which a hydraulic motor is mounted on each of a pair of left-hand and right-hand traveling sections each of a crawler type, a pair of variable flow rate control pumps are connected to the hydraulic motors via a closed circuit oil path, an operating section is coupled with and associated with both the variable flow rate control pumps to implement a steering operation and a change in respective speeds of the traveling sections, characterized in that a pump operating unit is provided in the operating section; and the pair of the variable flow rate control pumps are coupled with and associated with the pump operating unit via a spool link mechanism; wherein the operating section is disposed so as to be operated with a steering mechanism and a speed changing mechanism.

The hydraulically traveling agricultural machine according to the present invention is further provided with the features as will be described hereinafter:

1. The steering mechanism is configured so as to be operated with a circle-shaped steering wheel disposed above the operating section.

2. The pair of the variable flow rate control pumps are provided each with a cam plate angle control unit for controlling a cam plate of each of the variable flow rate control pumps, in which the cam plate angle control unit comprises a cam plate operating shaft for operating the cam plate, a servo cylinder connected to the cam plate operating shaft, a spool inserted in the servo cylinder over the entire length thereof, a spool control lever with its base end portion side connected to the spool and with its top end portion side connected to the spool link mechanism, a support shaft for supporting an intermediate portion of the spool control lever on a machine frame of the variable flow rate control pump, and a connecting rod disposed at an end of the spool link mechanism for connection to the spool, wherein the spool is disposed generally in parallel to the connecting rod disposed at the end of the spool link mechanism; and a support section for connecting the spool to the spool control lever is disposed on a plane substantially on a level with a support section for connecting the connecting rod to the spool control lever.

3. The pair of the spool link mechanisms are provided each with a connecting rod, and the connecting rods have each a substantially equal length.

4. The steering mechanism is provided with a circle-shaped steering wheel and the speed changing mechanism is provided with a lever for shifting forward and backward movements and for adjusting the speed of the travelling sections. Further, the lever is connected to a lever regulating member which can adjust the scope of the transmission shift of the lever and holding the lever in the neutral position. Moreover, the lever regulating member is disposed in parallel to a coupling passage for operating the speed changing mechanism.

5. An output shaft of the engine is coupled with and associated with a power pickup shaft via a transmission section which in turn is provided with a hydraulic clutch unit and a hydraulic brake device for forcibly stopping the rotation by inertia force of the hydraulic clutch unit, in which a pilot oil path for feeding pilot oil to the hydraulic clutch unit and the hydraulic brake device is connected thereto in series, an oil path change-over valve is mounted on the oil path at an intermediate portion thereof, a spool is inserted in a main valve body of the oil path change-over valve so as to be slidable, and a communicating passage communicating with the pilot oil path is provided by cutting away a communicating groove from a portion of a land section of the spool in an axial direction.

6. A throttle part is provided at an end side portion of the pilot oil path connected to the hydraulic brake device.

BRIEF DESCRIPTION OF THE ACCOMPANYING DRAWINGS

BEST MODES FOR CARRYING OUT THE INVENTION

The present invention will be described in more detail with reference to the accompanying drawings.

Figure 1:
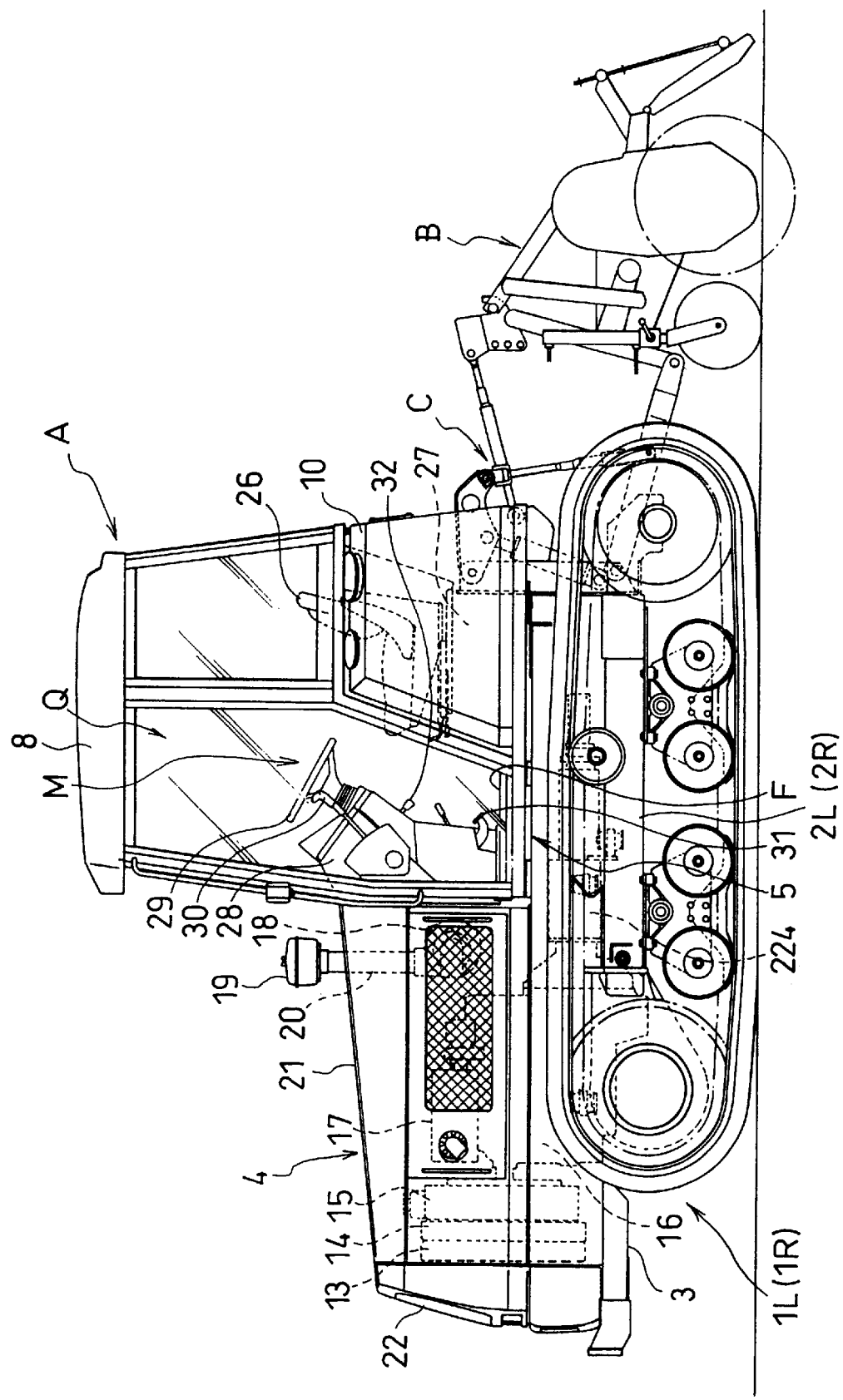
FIG. 1 is a side view showing an agricultural tractor as a hydraulically traveling agricultural machine according to an embodiment of the present invention.
Figure 2:
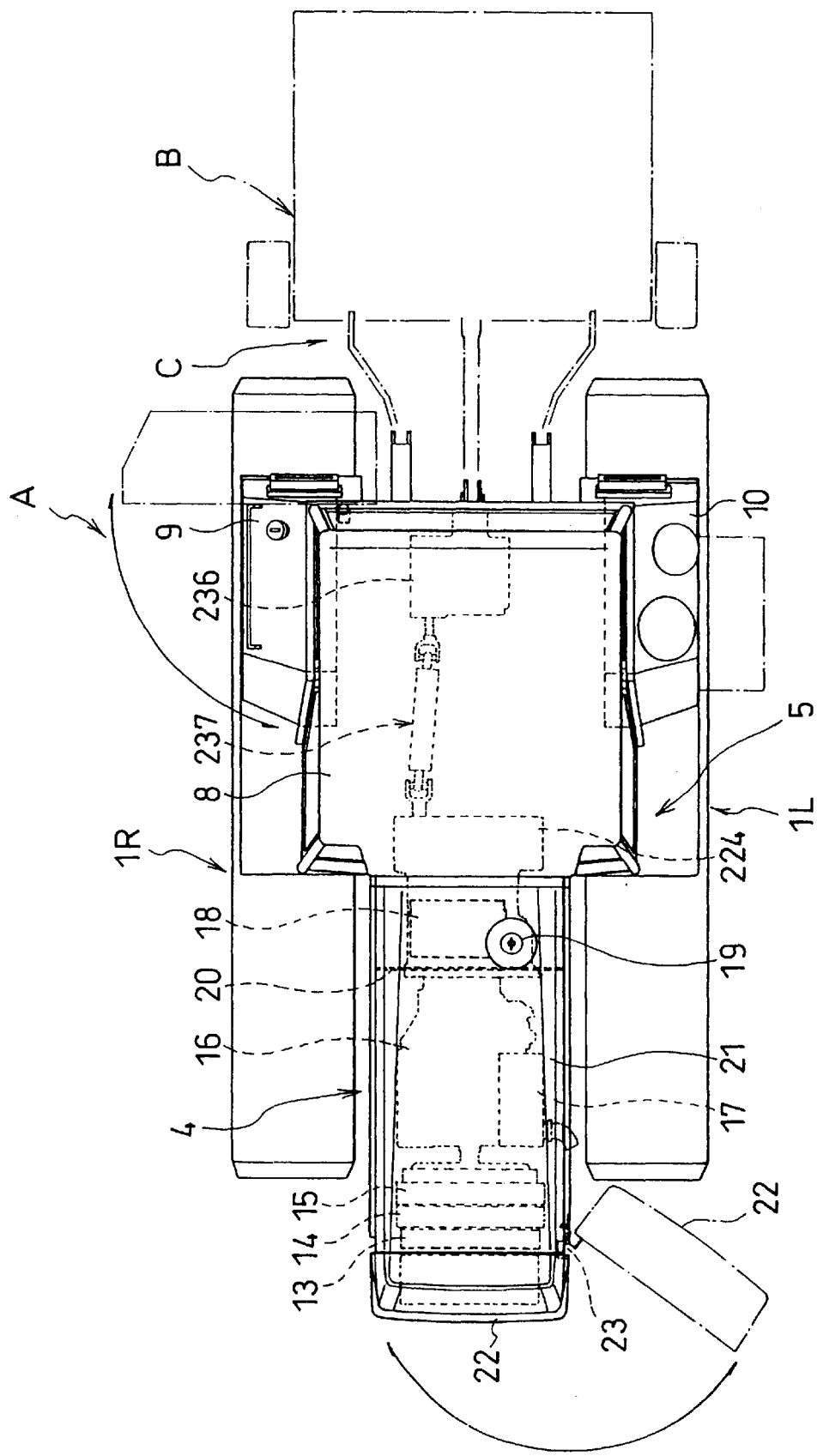
FIG. 2 is a plan view showing the agricultural tractor according to the present invention.

As shown in FIGS. 1 and 2, reference symbol A sets forth an agricultural tractor as a hydraulically traveling agricultural machine according to the present invention, which is provided with an operating section M. The agricultural tractor A is designed to carry out a variety of agricultural work by linking a variety of agricultural machines including, e.g. a rotary plough machine B, etc., via a three-link type lift mechanism C to the back side thereof so as to be lifted upward or lowered downward.

More specifically, as shown in FIGS. 1 and 2, the tractor A is configured such that an engine section 4 is disposed on a machine body frame 3 at its front portion, which extends latitudinally between left-hand and right-hand traveling section frames 2L and 2R of a pair of left-hand and right-hand traveling sections 1L and 1R each of a crawler type, respectively, and a machine frame 5 is disposed at its rear portion via front side and rear side vibration proofing members (not shown) as well as a cabin 8, a fuel tank 9 and an operating oil tank 10 are disposed on the machine frame 5.

As shown in FIGS. 1 and 2, the engine section 4 comprises a condenser 13, an oil cooler 14, a radiator 15, an engine 16, an exhaust manifold 17, a main cleaner 18, and a pre-cleaner 19, which are disposed and arranged in this order from the front end portion of the machine body frame 3 toward the rear end portion thereof Further, an air cut plate 20 disposed upright from the machine body frame 3 is interposed between the engine 16 and the main cleaner 18.

Furthermore, the engine section 4 is covered with a bonnet 21 and a front grille 22 mounted on a front side edge of the bonnet 21 via a support bracket 23 so as to be openable forwards.

Figure 3:
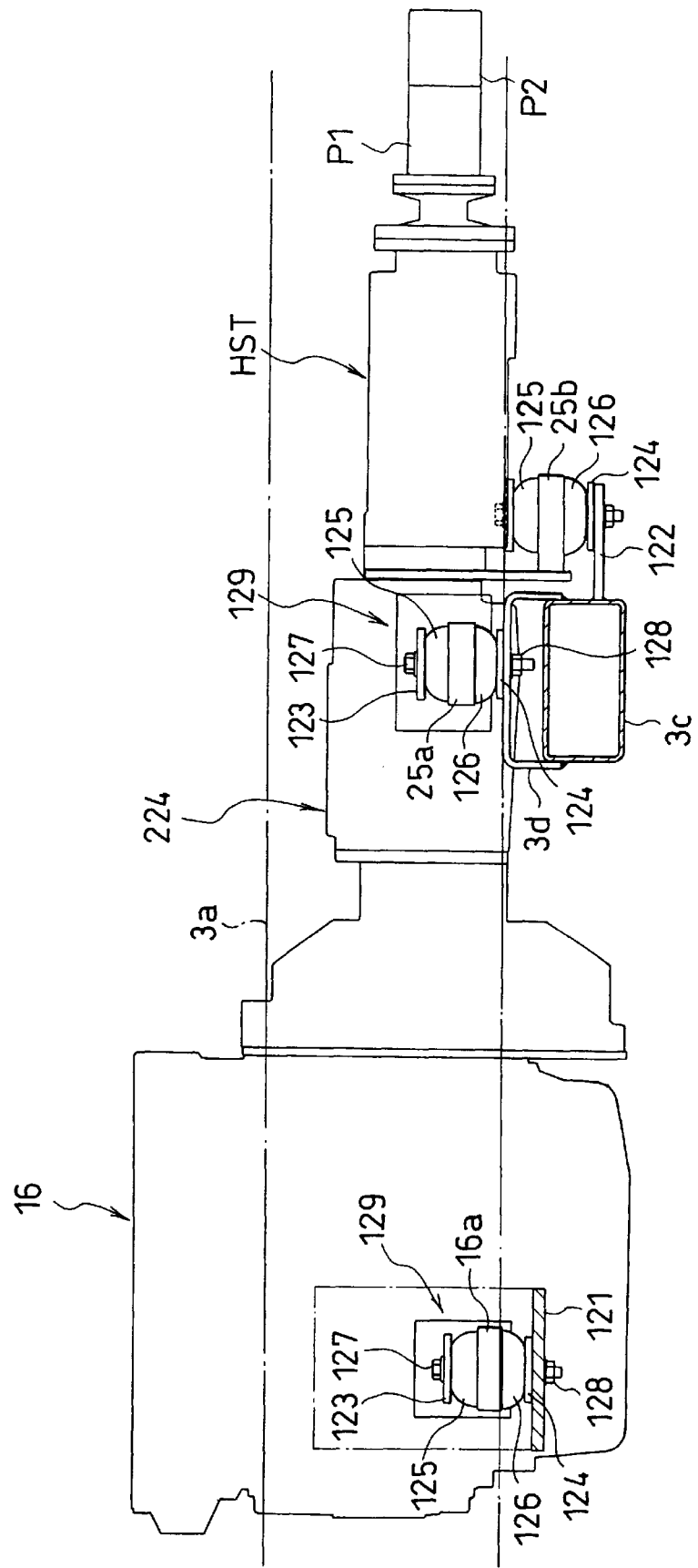
FIG. 3 is a side view showing a vibration proofing support structure of an engine.
Figure 4:
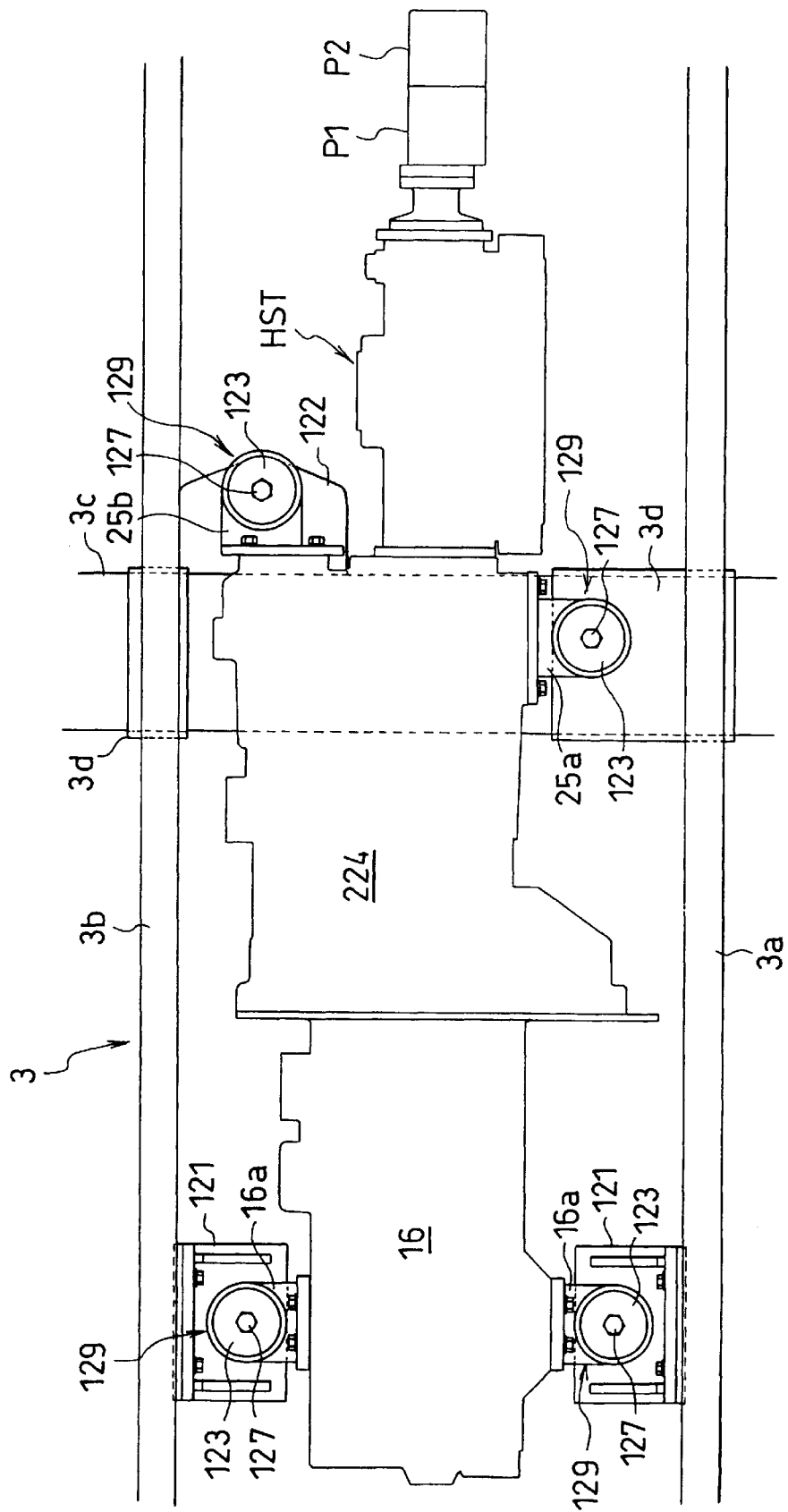
FIG. 4 is a plan view showing the vibration proofing support structure of the engine.

Moreover, as shown in FIGS. 3 and 4, the engine 16 is coupled with and associated with a front side transmission portion 224, a pair of left-hand and right-hand variable flow rate control pumps PL and PR, a hydraulic pump P1 for lifting and lowering the agricultural machines, and a charge pump P2, which are mounted integrally on the engine 16 in the forward and backward positions thereof Further, the engine 16 is supported integrally on the machine body frame 3 via vibration proofing members 129 and 129, while the front side transmission portion 224 is likewise supported integrally on the machine body frame 3 via vibration proofing members 129 and 129.

More specifically, as shown in FIGS. 3 and 4, the machine body frame 3 comprises a pair of left-hand and right-hand side frames 3a and 3b, each extending in forward and backward directions, and a lateral frame 3c extending between the bottom sides of the left-hand and right-hand side frames 3a and 3b at their intermediate portions via mounting brackets 3d and 3d. At front side portions of the side frames 3a and 3b are mounted stays 121 and 121, respectively, which in turn support left-hand and right-hand front side portions of the engine 16 via the vibration proofing members 129 and 129. A left-hand rear side portion of the front side transmission section 224 is supported with the left-hand mounting bracket 3d through the vibration proofing member 129 and a right-hand rear side portion of the front side transmission section 224 is supported with a stay 122 mounted on the right-hand rear side surface of the lateral frame 3c through the vibration proofing member 129.

As shown in FIGS. 3 and 4, each vibration proofing member 129 comprises a pair of an upper cover member 123 and a lower cover member 124, a pair of ring-shaped, upper and lower vibration proofing rubber members 125 and 126 interposed between the upper cover member 123 and the lower cover member 124, respectively, and a mounting bolt 127 inserted longitudinally therethrough and a mounting nut 128 for fixing them to the stays 121 and 122 or to the mounting bracket 3d.

Further, the vibration proofing member 129 located on the left-hand side of the engine 16 is mounted on the left-hand side wall of the engine 16 through a vibration proofing member mounting 16a protruding horizontally therefrom and interposed between a pair of the upper vibration proofing rubber member 125 and the lower vibration proofing rubber member 126. Likewise, the vibration proofing member 129 located on the right-hand side of the engine 16 is mounted on the right-hand side wall of the engine 16 through a vibration proofing member mounting 16a protruding horizontally therefrom and interposed between a pair of the upper vibration proofing rubber member 125 and the lower vibration proofing rubber member 126. Further, the vibration proofing member 129 disposed on the left-hand side of the front side transmission portion 224 is mounted on the rear side wall of the front side transmission portion 224 through a vibration proofing member mounting 25a protruding therefrom and interposed between a pair of the upper vibration proofing rubber member 125 and the lower vibration proofing rubber member 126. Similarly, the vibration proofing member 129 disposed on the right-hand side of the front side transmission portion 224 is mounted on the rear side wall of the front side transmission portion 224 through a vibration proofing member mounting 25b protruding therefrom and interposed between a pair of the upper vibration proofing rubber member 125 and the lower vibration proofing rubber member 126.

In the configuration of the vibration proofing members as described above, the vibration caused to occur with the engine 16 integrally disposed with the front side transmission portion 224 and each of the left-hand and right-hand variable flow rate control pumps PL and PR, the hydraulic pump P1, and the charge pump P2 can be absorbed with four of the vibration proofing members 129, 129, 129 and 129 to thereby fail to transmit the vibration to the machine body frame 3.

As shown in FIGS. 1 and 2, the cabin 8 is disposed on the machine frame 5 and provided with the operating section M on a floor section F thereof The operating section M is so configured as to control the variable flow rate control pumps PL and PR for the left-hand and right-hand traveling sections in a manner as will be described hereinafter, thereby accelerating or decelerating the respective hydraulic motors ML and MR for the left-hand and right-hand traveling sections in synchronism therewith. The steering operation and the speed changing operation of the machine can be controlled by the operation of the operating section M. An operation section Q comprises the operating section M, a seat support base 27 located behind the operating section M, and a seat 26 disposed on the seat support base 27.

Then, a description will be made of the operating section M as the essential part of the present invention with reference to FIGS. 5 to 9.

As shown in FIGS. 5 to 9, the operating section M is disposed on the side of a casing 40' which in turn is disposed extending in left-hand and right-hand directions and interposed between a pair of the left-hand and right-hand side frames 3a and 3b through stays 40a and 40b, and a pump operating unit 40 is disposed in the casing 40'. The pump operating unit 40 is so configured as to accelerate or decelerate a pair of the left-hand and right-hand spool link mechanisms NL and NR with a steering mechanism 33 and a speed changing mechanism 37, as will be described hereinafter in more detail.

Figure 5:
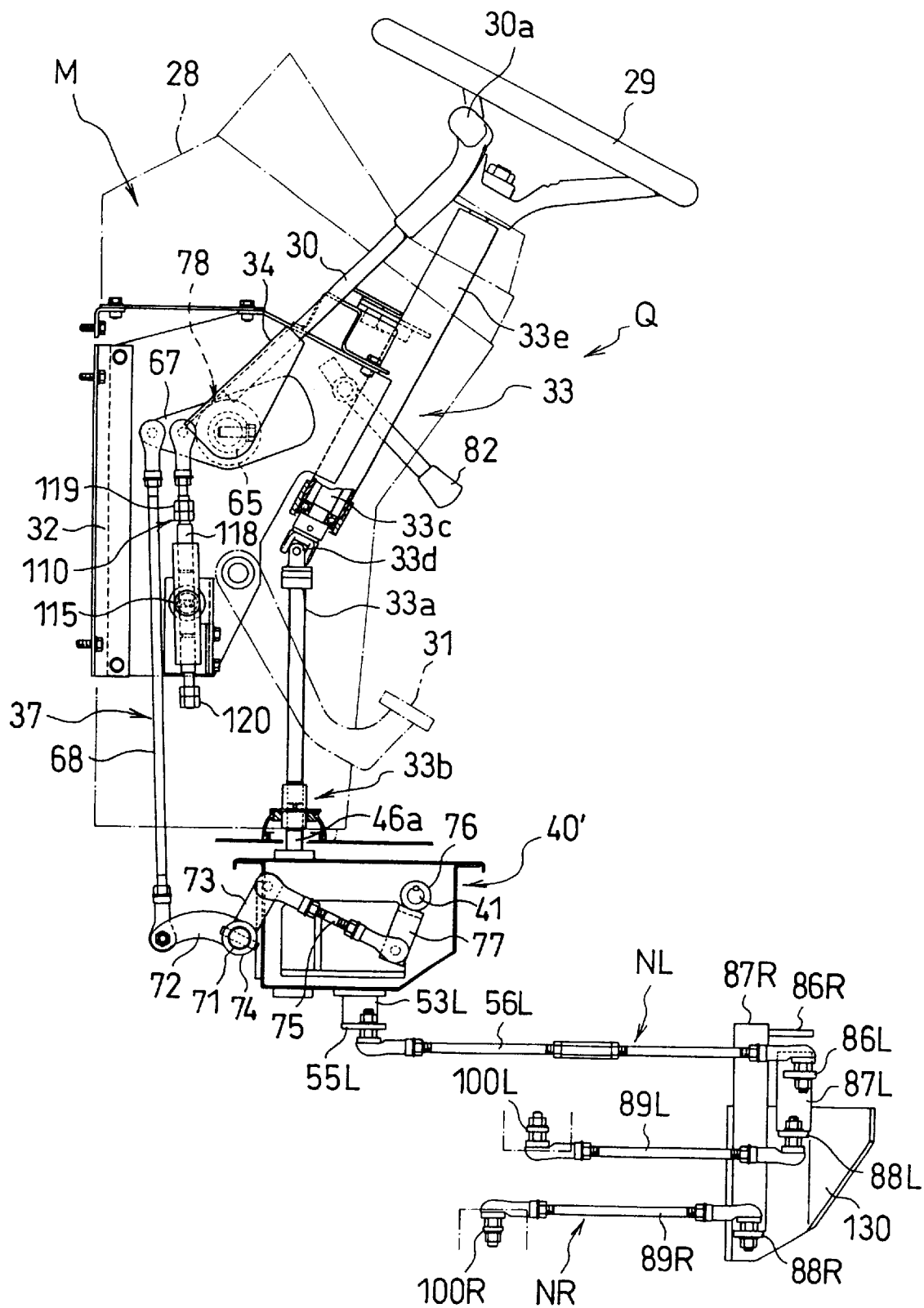
FIG. 5 is a side view showing an operating section of the agricultural machine according to the present invention.
Figure 6:
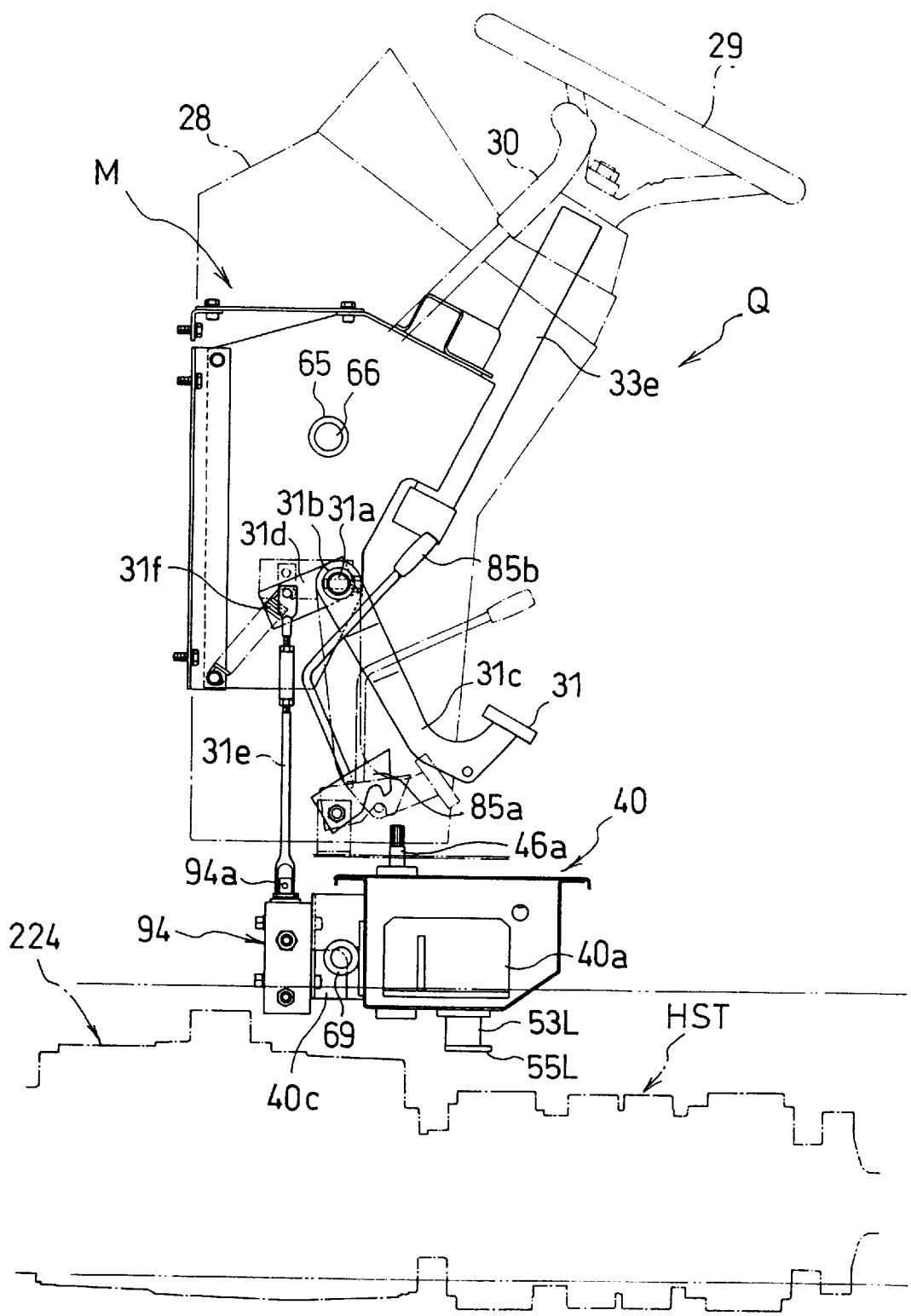
FIG. 6 is a side view showing the operating section thereof.
Figure 7:
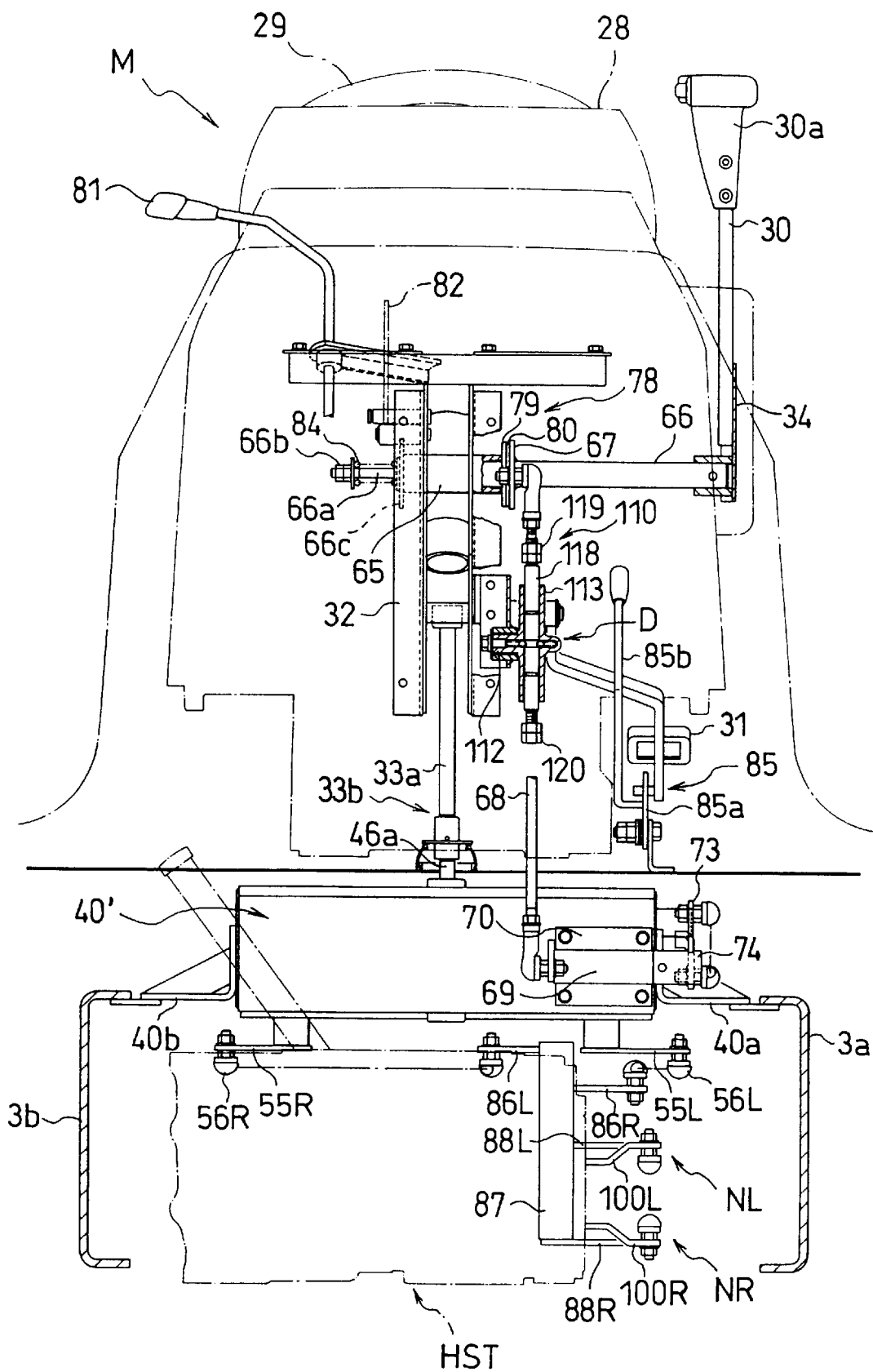
FIG. 7 is a front view showing the operating section thereof

On the casing 40', as shown in FIGS. 5 to 7, a handle column 28 is disposed standing upright and a circle-shaped steering wheel 29 constituting part of the steering mechanism 33 is mounted on a top portion of the handle column 28. A lever 30 for shifting forward and backward traveling and for adjusting a speed of the machine, which constitutes part of the speed changing mechanism 37, is mounted in a left-hand position close to the steering wheel 29.

Further, an acceleration lever 81 is mounted in a right-hand position close to the steering wheel 29. In the position immediately under the acceleration lever 81 is mounted a lever 82 for switching the pickup of the power, and a brake pedal 31 is disposed in an upper left position of the pump operating pump 40. In the drawings, reference numeral 85 denotes a brake pedal lock mechanism, reference numeral 85a denotes a locking hook for locking the brake pedal and reference numeral 85b denotes a lever for operating the pivotal movement of the locking hook.

Now, a description will be made of the steering mechanism 33 with reference to FIGS. 5 and 7. The steering mechanism 33 comprises a lower transmission shaft 33a, a coupling member 33b, an upper transmission shaft 33c, and a universal joint 33d. The bottom end portion of the lower transmission shaft 33a is connected to and coupled with a pinion shaft 46a via the coupling member 33b so as to be slidable in up-and-down directions. The pinion shaft 46a is disposed protruding upwards from a central front portion of a ceiling wall of the casing 40' for the pump operating unit 40. On the other hand, the upper end portion of the lower transmission shaft 33a is connected to and coupled with the bottom end portion of the upper transmission shaft 33c via the universal joint 33d. The upper transmission shaft 33c is disposed extending backwards in an upper direction. On the top of the upper transmission shaft 33c is mounted a central portion of the circle-shaped steering wheel 29.

Further, the upper transmission shaft 33c is inserted in a transmission shaft insertion tube 33e and held with a support machine frame 32 with the transmission shaft insertion tube 33e mounted on the handle column 28.

Therefore, the power can be transmitted by the pivotal operation of the steering wheel 29 in the way as will be described hereinafter. More specifically, the power from the upper transmission shaft 33c is transmitted through the universal joint 33d to the lower transmission shaft 33a, followed by transmitting the pivotal operation power through the coupling member 33b to the pinion 46a of the pump operating unit 40. The pivotal operation power is then transmitted from the pump operating unit 40 through a pair of the left-hand and right-hand spool link mechanisms NL and NR and then a pair of the left-hand and right-hand variable flow rate control pumps PL and PR to the hydraulic motors ML and MR for the left-hand and right-hand crawler-type traveling sections IL and IR. Then, the left-hand and right-hand crawler-type traveling sections IL and IR are steered by the power from the hydraulic motors ML and MR, respectively.

As the pinion shaft 46a of the pump operating unit 40 mounted on the machine body frame 3 is coupled to the bottom end portion of the lower transmission shaft 33a of the steering mechanism 33 via the coupling member 33b, the vibration of the machine body frame 3 which may be caused to occur during travelling can be absorbed with the coupling member 33b, thereby producing the effects of preventing the vibration from propagating to the steering wheel 29.

Therefore, this configuration can prevent the operator conducting the steering operation while holding the steering wheel 29 from making an error in operation, thereby enabling improvements in the operability of the machine.

Moreover, as the operation of the circle-shaped steering wheel 29 can accelerate or decelerate the pair of the left-hand and right-hand variable flow rate control pumps PL and PR in association with the pump operating unit 40 and the pair of the left-hand and right-hand spool link mechanisms NL and NR, the load of operation can be decreased, thereby enabling the steering operation with smoothness and certainty even at muddy spots in damp ground, etc., and leading to improvements in the operability of the machine.

On the other hand, as shown in FIGS. 5 and 7, the speed changing mechanism 37 is configured such that a shaft support pipe 65 extending in left-hand and right-hand directions is disposed latitudinally on the side of the support machine frame 32 and a lever support shaft 66 extending in left-hand and right-hand directions is inserted in the shaft support pipe 65, and the left side end portion of the lever support shaft 66 is connected through a connecting member 34 to the bottom end of a lever 30 for shifting forward and backward traveling and for adjusting the speed of the machine.

Further, the lever support shaft 66 is provided at an intermediate portion thereof with an operation arm 67 protruding toward the front and the front end portion of the operation arm 67 is connected to the upper end portion of a connecting rod 68. On the other hand, a boss portion 69 with its axis directed to the left and right is mounted on the left side part of the front wall of the pump operating unit 40 through a mounting bracket 70. A support shaft 71 extending in left-hand and right-hand directions is then disposed in the boss portion 69 and the base end of an arc-shaped arm 72 is mounted on the right side end portion of the support shaft 71 while the top end of the arc-shaped arm 72 is connected to the bottom end of the connecting rod 69.

Moreover, the support shaft 71 is connected at a left side end portion to the base end of an arm 73 via the boss portion 74 and the top end of the arm 73 is connected to a one end of a connecting rod 75. A boss portion 76 is provided on a left side end portion of a transmission shaft 41 disposed in the casing 40' and an arm 77 protruding from the boss portion 76 is connected to the other end of the connecting rod 75.

In the configuration as described above, upon effecting the pivotal operation of the lever 30 for shifting the forward and backward traveling and for adjusting the speed of the machine to the forward, i.e. on the side of shifting to the forward traveling or to the backward, i.e. on the side of shifting to the backward traveling, the pivotal force of the lever 30 is transmitted from the lever support shaft 66 through the operation arm 67 and the connecting rod 68 to the arc-shaped arm 72. The pivotal force is further transmitted from the arc-shaped arm 72 through the support shaft 71, the boss portion 74 and the arm 73 to the connecting rod 75, followed by transmission through the boss portion 76 to the transmission shaft 41.

Figure 8:
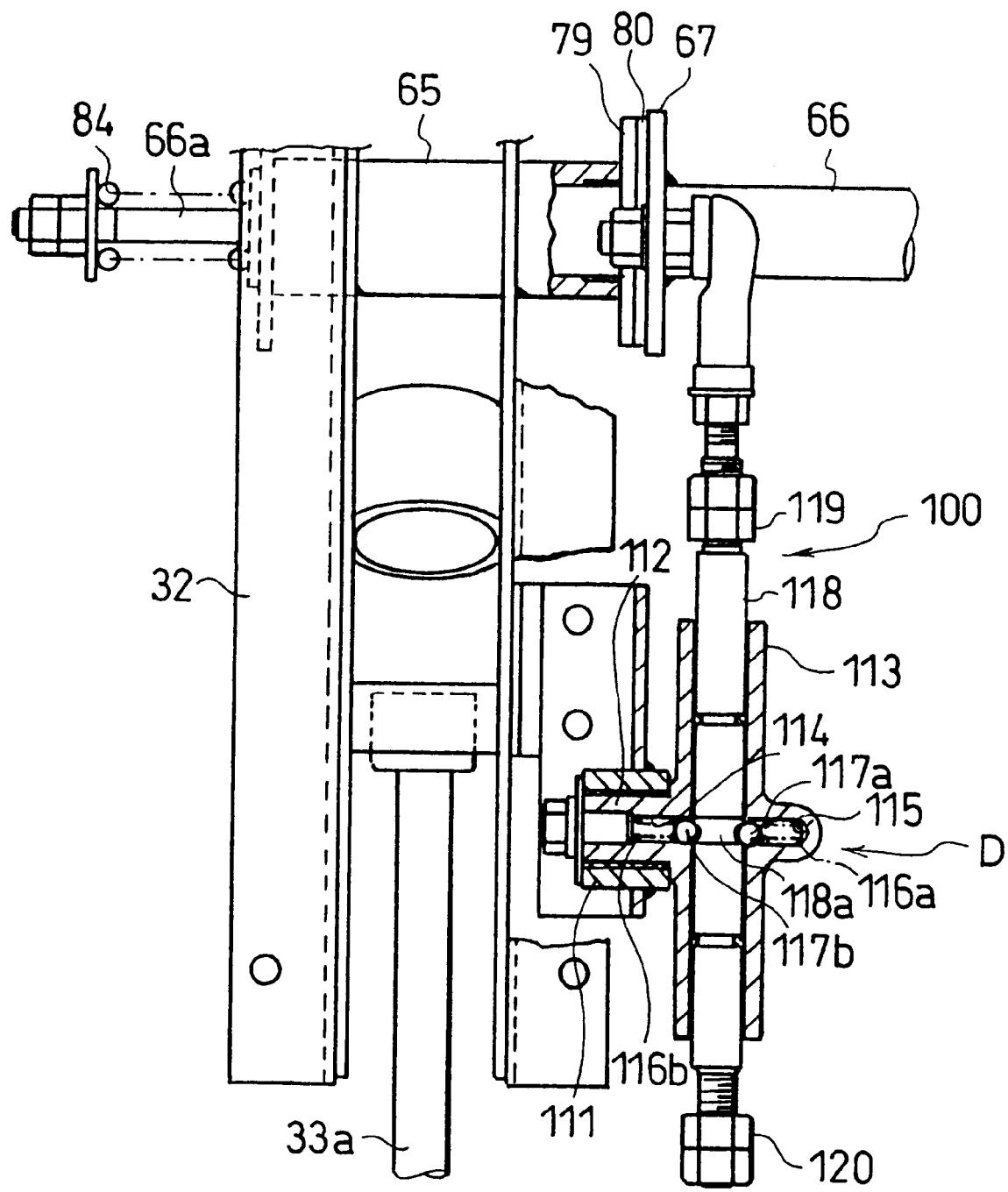
FIG. 8 is a sectional front view showing a lever regulating member.
Figure 9:
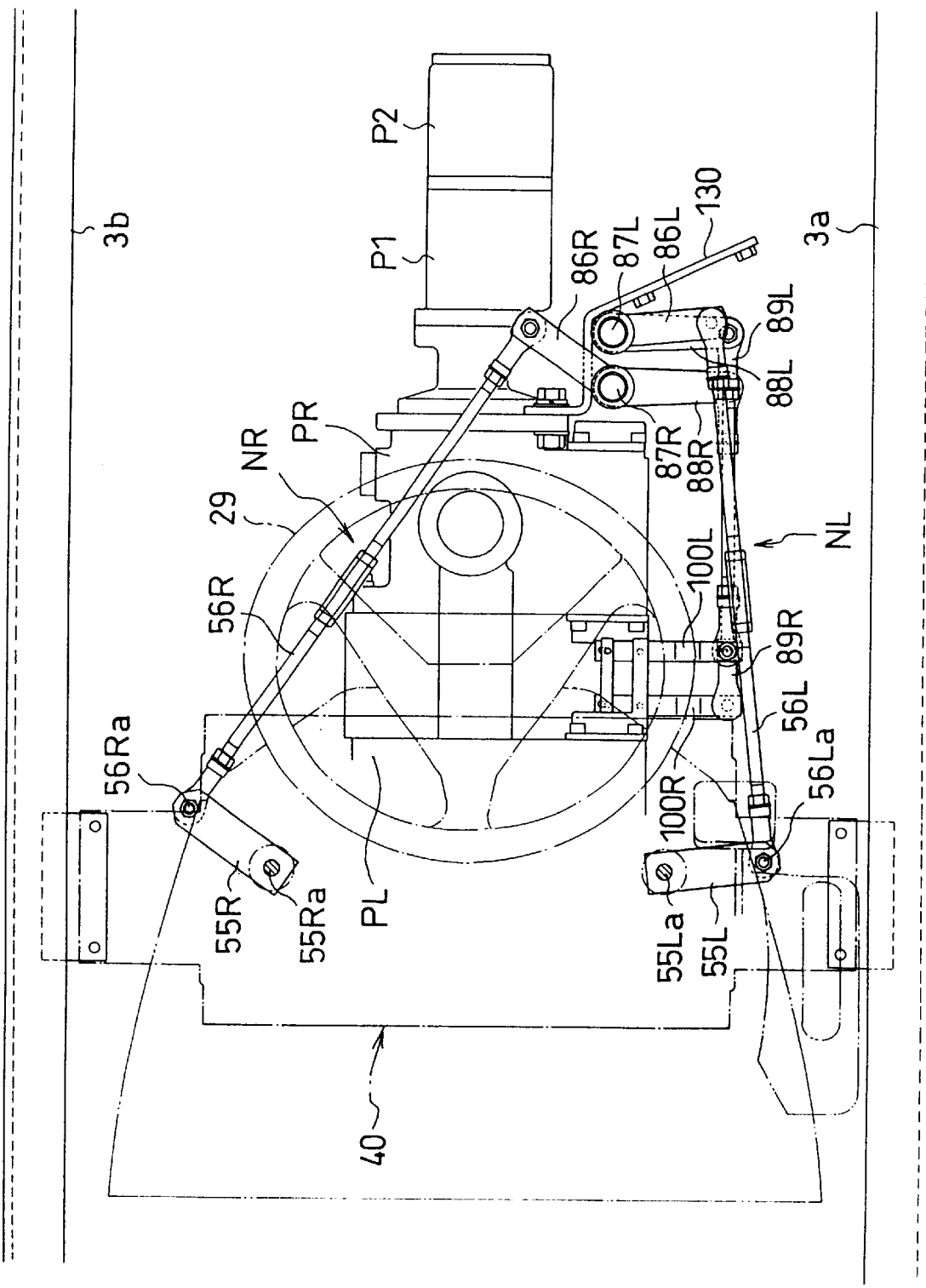
FIG. 9 is a front view showing the operating section thereof.

Moreover, as shown in FIGS. 5, 7 and 8, the lever 30 for shifting the forward and backward traveling and for adjusting the speed of the machine for the speed changing mechanism 37 is provided with a lever holding unit 78.

The lever holding unit 78 has a ring-shaped friction plate recipient member 79 mounted on a left-hand side end surface of the shaft support pipe 65 and a ring-shaped friction plate 80 is interposed between the ring-shaped friction plate recipient member 79 and the operation arm 67. On the other hand, the lever support shaft 66 disposed in the shaft support pipe 65 is provided with a rod 66a at a right-hand side end portion thereof, the rod 66a disposed protruding toward the outside from the right-hand side end of the shaft support pipe 65. Further, a spring 84 is interposed between a spring recipient member 66b mounted on an outside end portion of the rod 66a and a spring recipient member 66c disposed on the right-hand side end surface of the shaft support pipe 65 so as to be wound about the rod 66a.

The pressing force of the spring 84 allows the friction plate 80 to be pressed between the friction plate recipient member 79 and the operation arm 67.

Thus, when the lever 30 for shifting the forward and backward traveling and for adjusting the speed of the machine was operated to pivot in forward and backward directions and then the hand holding the lever 30 has released it, the lever 30 is allowed to be held in the operated position by means of the action of the friction plate 80.

Further, as shown in FIGS. 5, 7 and 8, the lever 30 for shifting the forward and backward traveling and for adjusting the speed of the machine is provided with a lever regulating member 110 which is configured so as to hold the lever 30 in its neutral position and to adjust the scope of the lever 30 for shifting the speed.

More specifically, as shown in FIGS. 5, 7 and 8, the lever regulating member 110 comprises a boss portion 111 mounted on the support machine frame 32 so as for its axis to be directed to the left-hand and right-hand sides, a support shaft 112 disposed in the boss portion 111 so as to be pivotable, a longitudinal guide cylinder 113 with its intermediate portion mounted integrally on the right-hand side end of the support shaft 112, a slide rod 118, with a top end thereof connected to the operation arm 67, disposed in the guide cylinder 113, and a detent mechanism D for alignment interposed between the slide rod 118 and the guide cylinder 113.

As shown in FIG. 8, the detent mechanism D is configured in such a manner that the guide cylinder 113 is provided at its intermediate portion on the right-hand side thereof with a ball space 115 and a neutrally holding ball 117a is accommodated in the space 115 so as to be biased with a spring 116a toward the other ball 117b held in a ball space 114 formed in the support shaft 112 so as to be biased with a spring 116b toward the neutrally holding ball 117a and that the slide rod 118 is provided with a groove 118a for engagement with the neutrally holding balls at its intermediate portion on the peripheral surface thereof.

Moreover, the slide rod 118 is screwed at its top with a forward speed regulating member 119 for regulating the scope of shifting the forward speed of the lever 30 for shifting the forward and backward traveling and for adjusting the speed of the machine and at its bottom end portion with a backward speed regulating member 120 for regulating the scope of shifting the backward speed of the lever 30, so as to allow the forward and backward positions to be adjusted in the axial direction of the slide rod 118.

In this configuration, when the lever 30 for shifting the forward and backward traveling and for adjusting the speed of the machine is located in the neutral position, the neutrally holding ball 117a is engaged with the neutrally holding ball 117b in the neutrally holding ball engagement groove 118a. On the other hand, when the lever 30 is shifted for forward or backward traveling, the slide rod 118 is caused to slide in resistance to the neutrally holding balls 117a and 117b biased with the respective springs 116a and 116b.

Therefore, the operator can readily perceive that the lever 30 is located in the neutral position or it is shifted from the neutral position to the forward or backward traveling side, thereby preventing the operator from making a mistake in operating the machine.

Further, when the lever 30 for shifting the forward and backward traveling and for adjusting the speed of the machine is operated to pivot to the forward on the forward transmission shift side, the forward speed regulating member 119 is allowed to abut with the top end surface of the guide cylinder 113 to thereby regulate the forward transmission shift of the lever 30.

On the other hand, when the lever 30 is operated to pivot to the backward on the backward transmission shift side, then the backward speed regulating member 120 is allowed to abut with the bottom end surface of the guide cylinder 113, thereby regulating the backward transmission shift of the lever 30.

Moreover, the forward speed regulating member 119 and the backward speed regulating member 120 can adjust the scope of operation of the lever 30 for shifting the forward and backward traveling and for adjusting the speed of the machine in their appropriate positions in accordance with preference by the operator.

Now, a description will be made of the purposes for mounting the lever regulating member 110.

As the lever 30 for shifting the forward and backward traveling and for adjusting the speed of the machine is operated to activate the speed changing mechanism 37, the connecting rod 68 interposed between the operation arm 67 and the arc-shaped arm 72 is allowed to move in a longitudinally elongated and oval way. It is difficult from the structural point of view, however, to couple the lever regulating member 110 with the speed changing mechanism 37 moving in such a way.

Therefore, the lever regulating member 110 is disposed along the coupling passage for operating the speed changing mechanism 37 to allow the slide rod 118 to smoothly slide in the guide cylinder 113 disposed in the lever regulating member 110, thereby permitting the detent mechanism D to hold the lever 30 for shifting the forward and backward traveling and for adjusting the speed of the machine in its neutral position and the forward speed regulating member 119 and the backward speed regulating member 120 to regulate the scope of the transmission shift of the lever 30.

Further, the lever 30 for shifting the forward and backward traveling and for adjusting the speed of the machine is disposed on the left-hand side close to the steering wheel 29 in order to adjust the forward and backward travelling speed of the left-hand and right-hand traveling sections 1L and 1R. A gripping part 30a at the top portion of the lever 30 for shifting the forward and backward traveling and for adjusting the speed of the machine is disposed close to a gripping part of the steering wheel 29.

Therefore, the operator can readily operate the lever 30 for shifting the forward and backward traveling and for adjusting the speed of the machine by the left hand, while implementing the steering wheel 29 by the right hand. In this configuration, even in work requiring a frequent shift of the forward and backward traveling, the steering operation can be done with safety and certainty, thereby improving the operability of the machine.

Further, as shown in FIGS. 6 and 7, the brake pedal 31 is configured such that a pedal arm 31c is mounted via a boss portion 31b on a pedal support shaft 31a protruding from the support machine frame 32 with its axis directed to left-hand and right-hand directions, an operating arm 31d is disposed protruding from the boss portion 31b in a forward and backward direction, and the operating arm 31d is connected to the top end of a connecting rod 31e.

Moreover, a pilot oil path change-over valve 94 is mounted via a stay 40c on the front wall of the casing 40' of the pump operating unit 40, and the bottom side end of the connecting rod 31e is connected to a spool 94a of the pilot oil path change-over valve 94. Reference symbol 31f sets forth a spring for returning the brake pedal.

In this configuration, when the brake pedal 31 is depressed, the power is transmitted from the boss portion 31b through the operating arm 3d and the connecting rod 31e to the spool 94a. This transmission of the power can then change the pilot oil paths.

Now, a description of the featuring aspects of the present invention will be made with reference to FIGS. 5 and 10. The left-hand and right-hand traveling sections 1L and 1R are provided with the left-hand and right-hand hydraulic motors ML and MR, respectively, which in turn are connected to the variable flow rate control pumps PL and PR disposed in a hydrostatic transmission (HST) to thereby constitute a two-pump, two-motor non-stage transmission mechanism. Further, the pump operating unit 40 is coupled to the variable flow rate control pumps PL and PR through the respective spool link mechanisms NL and NR. Moreover, the pump operating unit 40 is coupled with the steering wheel 29 of a rotary type disposed in the steering mechanism 33 and with the lever 30 for shifting the forward and backward traveling and for adjusting the speed of the machine disposed in the speed changing mechanism 37.

In the configuration as described above, when the steering wheel 29 is rotated in either of a left-hand or right-hand direction, the number and the direction of rotation of the left-hand and right-hand hydraulic motors ML and MR on the side of rotation operation are changed, thereby enabling steering the machine.

Further, by operating the lever 30 for shifting the forward and backward traveling and for adjusting the speed of the machine so as to pivot in a forward or backward direction, the number of rotation and the direction of rotation of the corresponding left-hand and right-hand hydraulic motors ML and MR for the respective left-hand and right-hand traveling sections are changed, thereby enabling the operation for shifting the forward and backward movements and the stop of the machine and for adjusting the speed of the machine.

Figure 10:
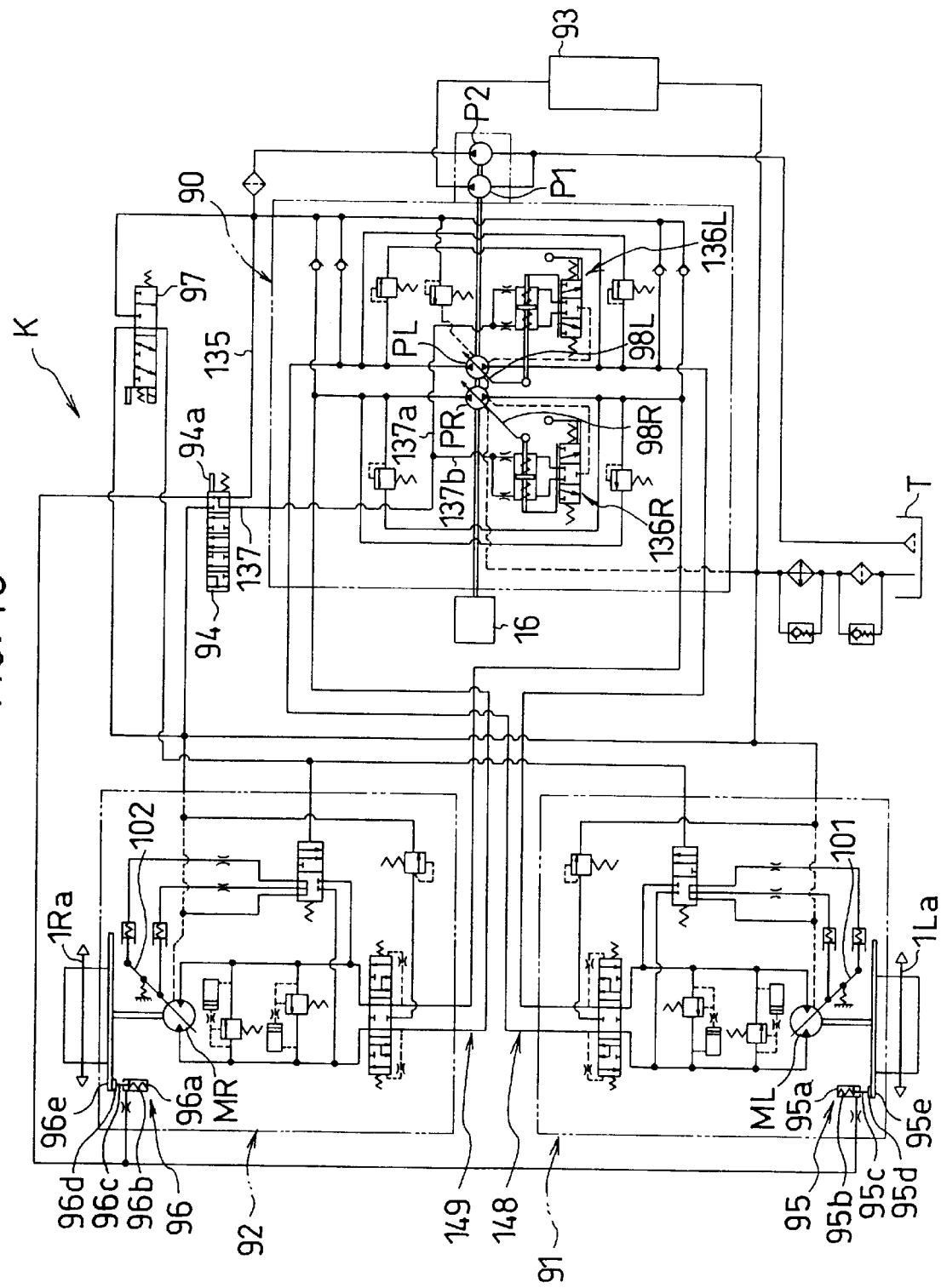
FIG. 10 is a circuit diagram showing a hydraulic circuit.

A description is then made of a hydraulic circuit K with reference to FIG. 10. The hydraulic circuit K comprises a HST hydraulic circuit 90 connected to a hydraulic tank T as well as a hydraulic circuit 91 for driving the left-hand traveling section and a hydraulic circuit 92 for driving the right-hand traveling section, each connected to the HST hydraulic circuit 90.

The HST hydraulic circuit 90 is provided with a pair of the variable flow rate control pumps PL and PR to which a hydraulic pump P1 for elevating or lowering a working machine is coupled, and a hydraulic circuit 93 is connected to the hydraulic pump P1.

Further, the variable flow rate control pumps PL and PR is coupled with a charge pump P2 which in turn is connected through a pilot oil path 135 to a brake device 95 disposed in the hydraulic circuit 91 for driving the left-hand traveling section and to a brake device 96 disposed in the hydraulic circuit 92 for driving the right-hand traveling section. The pilot oil path 135 is provided with a pilot oil path change-over valve 94 at an intermediate portion thereof In the drawings, reference numeral 97 sets forth a shift valve for operating a bypass.

The pilot oil path change-over valve 94 is coupled to the brake pedal 31 so as to be shifted in association of the operation of depressing the brake pedal 31, thereby braking the brake devices 95 and 96.

More specifically, the brake device 95 is configured such that a cylinder 95a is provided with a piston rod 95c biased so as to be elongated with a spring 95b and a pressing member 95d is mounted on the tip of the piston rod 95c so as to come into contact with or depart from the main body 95e of the brake device 95 mounted on the driving wheel 1La of the left-hand traveling section 1L. On the other hand, the brake device 96 is likewise configured such that a cylinder 96a is provided with a piston rod 96c biased so as to be elongated with a spring 96b and a pressing member 96d is mounted on the tip of the piston rod 96c so as to come into contact with or depart from the main body 96e of the brake device 96 mounted on the driving wheel 1Ra of the right-hand traveling section 1R.

In the configuration as described above, pilot oil is fed to the cylinder 95a, thereby contracting the piston rod 95c in resistance to the biasing of the spring 95b and releasing the braking with the pressing member 95d from the main body 95e of the brake device and bringing it into a non-braked state. Likewise, pilot oil is fed to the cylinder 96a to contract the piston rod 96c in resistance to the biasing of the spring 96b and releasing the braking with the pressing member 96d from the main body 96e of the brake device and bringing it into a non-braked state.

On the other hand, when the pilot oil is discharged from the cylinder 95a, the piston rod 95c is elongated by the biasing force of the spring 95b, thereby allowing the pressing member 95d to press the main body 95e of the brake device 95 which in turn is brought into a braked state. When the pilot oil is likewise discharged from the cylinder 96a, the piston rod 96c is allowed to elongate by the biasing force of the spring 96b, thereby allowing the pressing member 96d to press the main body 96e of the brake device 96 to bring it into a braked state.

Therefore, the operation of depressing the brake pedal 31 allows the left-hand and right-hand brake devices 95 and 96 to concurrently stop the driving of the left-hand and right-hand traveling sections 1L and 1R so that even in case of emergency the depressing operation for braking the brake devices can be conducted in substantially the same feeling as driving a car, thereby ensuring a high degree of safety.

Further, as shown in FIG. 10, the pilot oil path 135 at its intermediate portion is connected to a branch pilot oil path 137 via the pilot oil path change-over valve 94 and a topside end of the branch pilot oil path 137 is divided into two branch oil paths 137a and 137b. Furthermore, the variable flow rate control pump PL is provided with a cam plate angle control units 136L which in turn is connected to the branch oil path 137a and, likewise, the variable flow rate control pump PR is provided with a cam plate angle control units 136R which in turn is connected to the branch oil path 137b. In the drawing, reference numerals 101 and 102 denote cam plates, respectively, disposed in the left-hand and right-hand hydraulic motors ML and MR for the left-hand and right-hand travelling sections.

Figure 11:
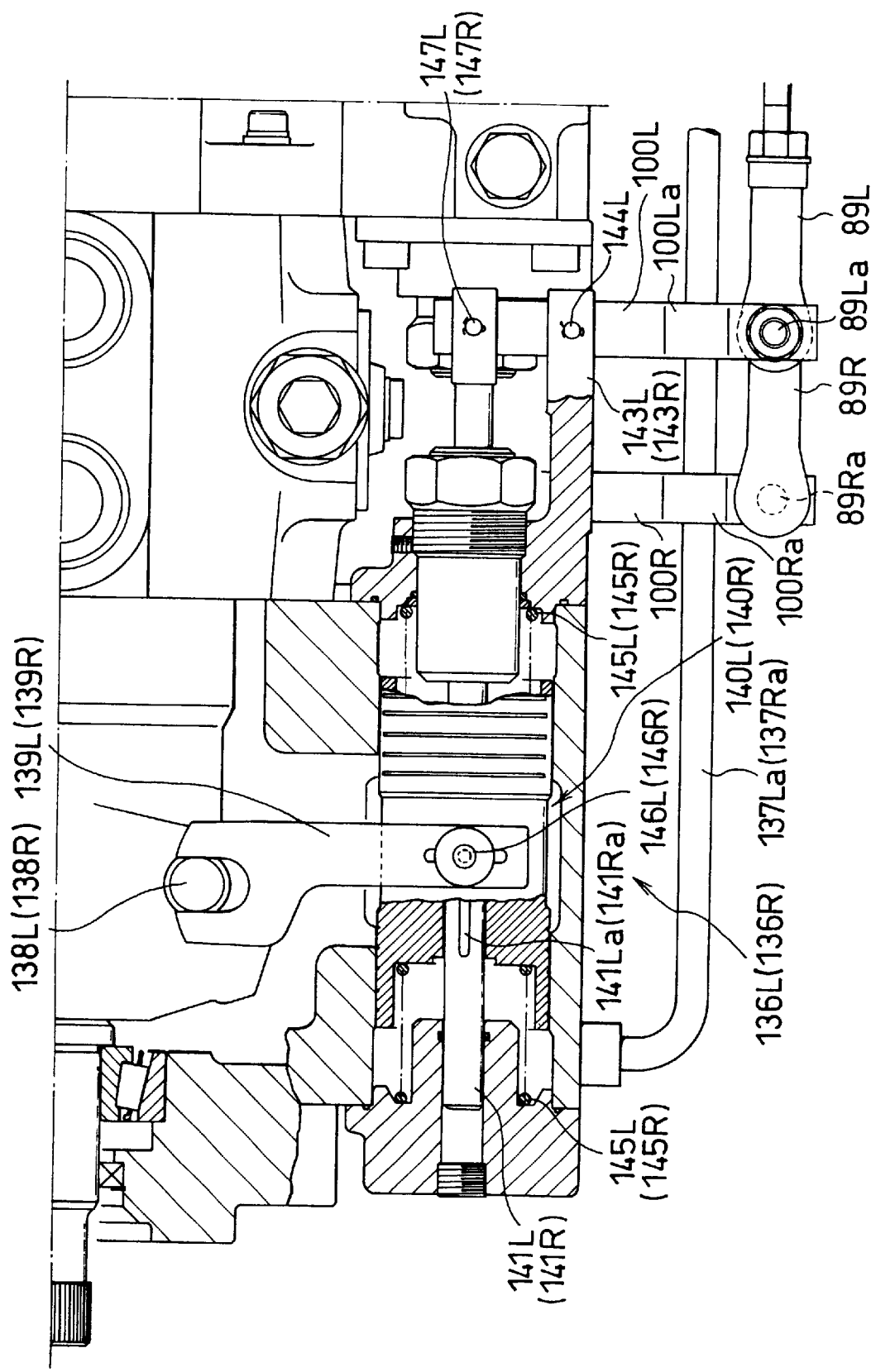
FIG. 11 is a partially cut-away plan view showing a cam plate angle control unit.
Figure 12:
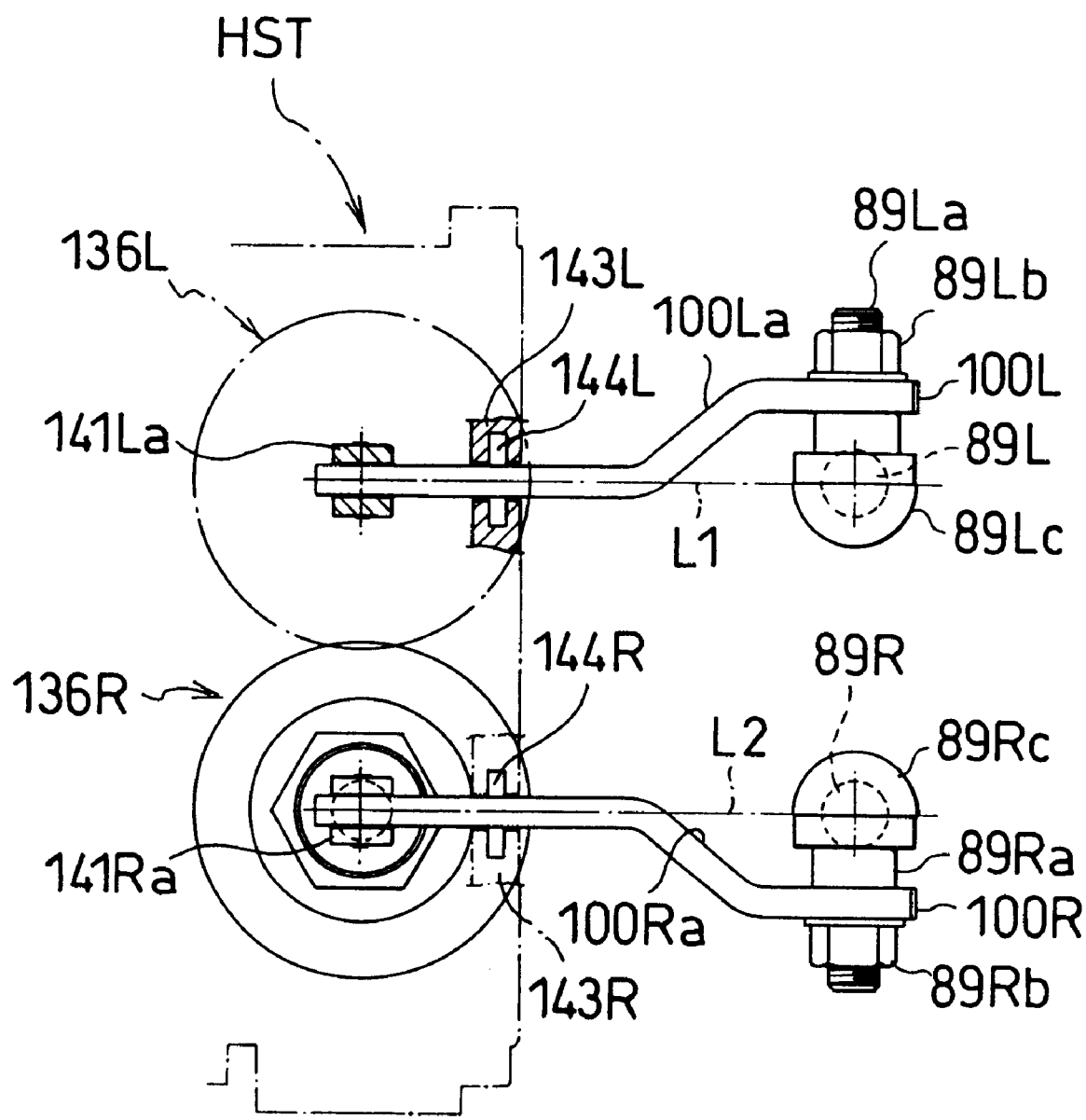
FIG. 12 is a partially cut-away plan view showing a spool control lever.

As shown in FIGS. 10 to 12, the cam plate angle control unit 136L (136R) comprises a cam plate operating shaft 138L (138R) coupled interlockingly to a cam plate 98L (98R), and a trunnion arm 139L connected at its base end to the cam plate operating shaft 138L (138R). The topside end of the trunnion arm 139L (139R) supports and is connected to the intermediate portion of a servo cylinder 140L (140R) extending in the direction intersecting at a generally right angle to the direction in which the trunnion arm 139L (139R) extends.

Further, a spool 141L (141R) is inserted in the servo cylinder 140L (140R) over the entire length thereof and a one end of the spool 141L (141R) supports and is connected to a base end of a spool control lever 100L (100R). Further, an intermediate portion of the spool control lever 100L (100R) is supported with a lever support section 143L (143R) formed in a machine frame of the variable flow rate control pump PL (PR) by means of a support shaft 144L (144R). To the topside end of the spool control lever 100L (100R) is connected the topside end of a second connecting rod 89L (89R) disposed at an end of the spool link mechanism NL (NR) in order to allow connection to the spool 141L (141R).

Furthermore, the support shaft 144L (144R) is disposed with its axis directed to the direction intersecting at a right angle to the direction in which the axis of the spool 141L (141R) extends. In the drawings, reference symbol 145L (145R) denotes a spring for returning to the neutral position and it is disposed each on both the sides of the servo cylinder 140L (140R) in the sliding direction. Reference symbols 146L (146R) and 147L (147R) denote connecting pins.

In addition, an oil path 141La (141Ra) formed on the circumferential surface of the spool 141L (141R) is connected to a branch oil path 137La (137Ra) of the branch pilot oil path 137L (137R), thereby enabling feeding a predetermined amount of pilot oil from the branch oil path 137La (137Ra) through the oil path 141La (141Ra) of the spool 141L (141R) to the servo cylinder 140L (140R) and sliding the servo cylinder 140L (140R) by a predetermined distance along the spool 141L (141R) in accordance with the amount of the pilot oil fed.

Therefore, when the lever 30 for shifting the forward and backward traveling and for adjusting the speed of the machine and the steering wheel 29 are each operated, the speed changing operation and the steering operation of the machine can be done with the steering mechanism 33, the speed changing mechanism 37, the pump operating unit 40 and the left-hand and right-hand spool link mechanisms NL and NR in the manner as will be described hereinafter.

More specifically, when the lever 30 for shifting the forward and backward traveling and for adjusting the speed of the machine is operated to travel on either of the forward side or backward side, e.g., when it is operated to travel on the forward side, the spool control lever 100L is allowed to slide with a second connecting rod 89L connected to the end of the left-hand spool link mechanism NL via the speed changing mechanism 37 and the pump operating unit 40, thereby causing the spool 141L to slide on the forward travelling side in association with the action of the spool control lever 100L. Likewise, the spool control lever 100R is allowed to slide by means of a second connecting rod 89R connected to the end of the right-hand spool link mechanism NR via the speed changing mechanism 37 and the pump operating unit 40, thereby sliding the spool 141R on the forward traveling side in association with the action of the spool control lever 100R.

In this configuration, a predetermined amount of pilot oil is fed from the branch oil paths 137L*a* and 137R*a* to the respective servo cylinders 140L and 140R in accordance with the amount in which each of the servo cylinders 140L and 140R slides, and the servo cylinders 140L and 140R are allowed to slide on the forward travelling side in accordance with the amount of the pilot oil fed.

In association with the sliding movement of the servo cylinder 140L, the trunnion arm 139L is allowed to pivot by a predetermined angle and the cam plate operating shaft 138L is also allowed to pivot by a predetermined angle in accordance with the pivotal angle of the trunnion arm 139L, thereby altering the angle of the cam plate 98 coupled with the cam plate operating shaft 138L and controlling the flow rate of the pressure oil to be fed to the left-hand hydraulic motor ML for the left-hand travelling section from the variable flow rate control pump PL leading to changing the number of rotation of the left-hand hydraulic motor ML for the left-hand travelling section. Likewise, when the servo cylinder 140R slides, the trunnion arm 139R pivots by a predetermined angle and the cam plate operating shaft 138R pivots by a predetermined angle, too, in accordance with a pivotal angle of the trunnion arm 139R. Further, the angle of the cam plate 99 coupled with the cam plate operating shaft 138R is altered to control the flow rate of the pressure oil to be fed to the right-hand hydraulic motor MR for the right-hand travelling section from the variable flow rate control pump PR. Then, the number of rotation of the right-hand hydraulic motor MR for the right-hand travelling section is changed, As a result, the machine is traveled forwards at a speed corresponding to the amount of the operation of the lever 30.

On the other hand, when the lever 30 for shifting the forward and backward traveling and for adjusting the speed of the machine is operated to travel on the backward side in the manner substantially similar to the way in which the lever 30 is operated to travel forwards, the machine is allowed to travel backward at a speed corresponding to the amount of operation of the lever 30 for shifting the forward and backward traveling and for adjusting the speed of the machine.

In this instance, by the sliding movement of the servo cylinders 140L and 140R utilizing the pilot oil pressure, the load of operation to be imposed on the trunnion arms 139L and 139R of the lever 30 for shifting the forward and backward traveling and for adjusting the speed of the machine can be reduced, thereby enabling shortening the length of the lever 30 and disposing the lever 30 in the position close to the steering wheel 29. As a result, the operation of the lever 30 can be made with smoothness and certainty.

Moreover, the position of operating the lever 30 for shifting the forward and backward traveling and for adjusting the speed of the machine can be held with the lever holding unit 78. Therefore, when the brake pedal 31 is depressed to stop the driving of the left-hand and right-hand traveling sections 1L and 1R, the pilot oil path change-over valve 94 is activated to discharge pilot oil, thereby returning the servo cylinders 140L and 140R to their neutral positions with the neutrally returning springs 145L and 145R and allowing the cam plates 98 and 99 to assume the neutral postures via the trunnion arms 139L and 139R, respectively.

Further, when the steering wheel 29 is turned to either of the left or right, e.g. to the left, the left-hand spool control lever 100L is caused to slide with the second connecting rod 89L disposed in the left-hand spool link mechanism NL through the speed changing mechanism 37 and the pump operating unit 40 and the left-hand spool 141L is allowed to slide on the decelerating side in association with the left-hand spool control lever 100L.

Then, a predetermined amount of pilot oil is fed to the left-hand servo cylinder 140L through the topside branch oil path 137*a* in accordance with the amount in which the left-hand spool 141L slides, thereby allowing the left-hand servo cylinder 140L to slide on the decelerating side in accordance with the amount of the pilot oil fed.

Moreover, in association with the sliding movement of the left-hand servo cylinder 140L, the left-hand trunnion arm 139L is caused to pivot by a predetermined angle and the left-hand cam plate operating shaft 138L is allowed to pivot by a predetermined angle in association with the pivotal angle of the left-hand trunnion arm 139L. The pivotal movement of the left-hand cam plate operating shaft 138L can alter the angle of the left-hand cam plate 98 coupled with the left-hand cam plate operating shaft 138L and control the flow rate of the pressure oil to be fed to the hydraulic motor ML for the left-hand travelling section from the left-hand variable flow rate control pump PL, thereby decreasing the number of rotation of the hydraulic motor ML for the left-hand travelling section.

As a consequence, the left-hand travelling section 1L is allowed to decelerate the speed or stop its movement, while the right-hand travelling section 1R is allowed to travel at a speed without change, thereby enabling the machine to slowly turn to the left or make a pivot turn to the left.

When the steering wheel 29 is further steered to the left at an angle greater than the predetermined angle, the left-hand cam plate 98 is inclined on the backward control side with the pump operating unit 40 in a manner as will be described hereinafter, thereby causing the left-hand hydraulic motor ML for the left-hand travelling section to rotate in the reverse direction.

As a result, the left-hand travelling section 1L is caused to travel in the backward direction, while the right-hand travelling section 1R is kept travelling in the forward direction at a speed without change, thereby allowing the machine to make a spin turn to the left.

On the other hand, when the steering wheel 29 is turned to the right to the contrary, the machine is allowed to turn slowly to the right or make a pivot turn to the right in substantially the same manner as above. When the steering wheel 29 is further turned to the right at an angle greater than the predetermined angle, then the machine is allowed to make a spin turn to the right.

When the brake pedal 31 is depressed while operating each of the lever 30 for shifting the forward and backward traveling and for adjusting the speed of the machine and the steering wheel 29 in the manner as described above, the pilot oil path change-over valve 94 is switched in association with the depressing operation of the brake pedal, thereby braking the brake device 95 for the left-hand traveling section 1L. Concurrently with the braking operation, the pilot oil is discharged from the branch pilot oil path 137L and the pilot oil fed to the servo cylinder 140L is also discharged. As the pilot oil was discharged from the servo cylinder 140L, it is caused to return to its neutral position by means of the neutrally returning spring 145L to thereby allow the trunnion arm 139L to pivot in association with the servo cylinder 140L. The pivotal movement of the trunnion arm 139L causes the cam plate operating shaft 138L to return the cam plate 98 to its neutral positions, thereby stopping the flow of operating oil through closed circuit oil passage 148 interposed between the variable flow rate control pump PL and the left-hand hydraulic motor ML for the left-hand travelling section 1L. Likewise, when the brake pedal 31 is depressed, the pilot oil path change-over valve 94 is switched to brake the brake device 96 for the right-hand travelling section 1R. Concurrently, the pilot oil in the branch pilot oil path 137R is discharged while the pilot oil fed to the servo cylinder 140R is also discharged. On discharging, the servo cylinder 140R is returned to its neutral position, thereby causing the trunnion arm 139R to pivot and the cam plate operating shaft 138R to return the cam plate 99 to its neutral position. This causes the flow of the operating oil in the closed circuit oil path 149 interposed between the variable flow rate control pump PR and the hydraulic motor MR for the right-hand travelling section 1R to discontinue.

Therefore, in the configuration as described above, the driving of the left-hand and right-hand traveling sections 1L and 1R can be stopped in a smooth and sure way by the braking operation with the brake devices 95 and 96 in association with the discontinuation of the flow of the operating oil by returning the cam plates 98L and 98R of the variable flow rate control pumps PL and PR. Further, the discontinuation of the flow of the operating oil can also prevent an occurrence of vibration and noises.

On the other hand, upon releasing the operation of depressing the brake pedal 31, the pilot oil is allowed to flow in the servo cylinders 140L and 140R through the pilot oil paths to thereby return the cam plates 98 and 99 to their original angles, respectively, as the spools 141L and 141R coupled to the lever 30 for shifting the forward and backward traveling and for adjusting the speed of the machine are held in the original positions for operating the lever.

Therefore, even if the braking operation with the brake pedal 31 is released, the position of operating the lever 30 for shifting the forward and backward traveling and for adjusting the speed of the machine can be held so that the machine can be traveled at its originally set speed with the lever 30 for shifting the forward and backward traveling and for adjusting the speed of the machine. Therefore, it is not required to return the lever 30 for shifting the forward and backward traveling and for adjusting the speed of the machine to its original position.

Now, a description will be made of the spool control levers 100L and 100R with reference to FIG. 12. The spool control lever 100L is configured such that it is curved upwardly at its intermediate portion to form a step section 100L$a$ which in turn is connected on its top end portion side to a one end of the second connecting rod 89L of the spool link mechanism NL. On the other hand, similarly, the spool control lever 100R is curved downwardly at its intermediate portion to form a step section 100R$a$ which in turn is connected on its top end portion side to a one end of the second connecting rod 89R of the spool link mechanism NR. The spool link mechanisms NL and NR will be described in more detail hereinafter.

Further, the axis of the spool 141L connected to its base end portion side of the spool control lever 100L is disposed generally in parallel to the axis of the second connecting rod 89L connected on the top end portion side thereof, while it is disposed so as to intersect the support shaft 144L of the spool control lever 100L at a generally right angle. Likewise, the axis of the spool 141R connected to its base end portion side of the spool control lever 100R is disposed so as to become generally parallel to the axis of the second connecting rod 89R connected on the top end portion side thereof, while it is disposed so as to intersect the support shaft 144R of the spool control lever 100R at a generally right angle. In the drawing, reference symbols 89L$b$ and 89R$a$ denote each a rod connecting nut.

Moreover, it is configured such that a support section 14L$a$ connecting the spool 141L to the spool control lever 100L is disposed on a plane L1 generally on a level with a support section 89L$a$ connecting the second connecting rod 89L to the spool control lever 100L, while a support section 141R$a$ connecting the spool 141R to the spool control lever 100R is disposed on a plane L2 generally on a level with a support section 89L$a$ connecting the second connecting rod 89R to the spool control lever 100R.

Therefore, when the second connecting rod 89L is operated, no moment in a twisting direction acts on the spool control lever 100L for operating the spool 141L so that the spool 141L can be operated in a smooth and sure way, thereby enabling a smooth and sure control of the angle of the cam plate and improving the operability of the steering wheel 29 and the lever 30 for shifting the forward and backward traveling and for adjusting the speed of the machine. The same thing can be said of the operation of the second connecting rod 89R because a smooth and certain operation of the spool 141R can be ensured due to the action of no moment in a twisting direction upon the spool control lever 100R.

Then, the pump operating unit 40 will be described in more detail. The pump operating unit 40 is accommodated in the casing 40' which in turn is interposed between a pair of left-hand and right-hand side frames 3$a$ and 3$b$ and located in the position below a lower transmission shaft 33$a$ of the steering wheel 29 and the connecting rod 68 of the lever 30 for shifting the forward and backward traveling and for adjusting the speed of the machine.

Figure 13:
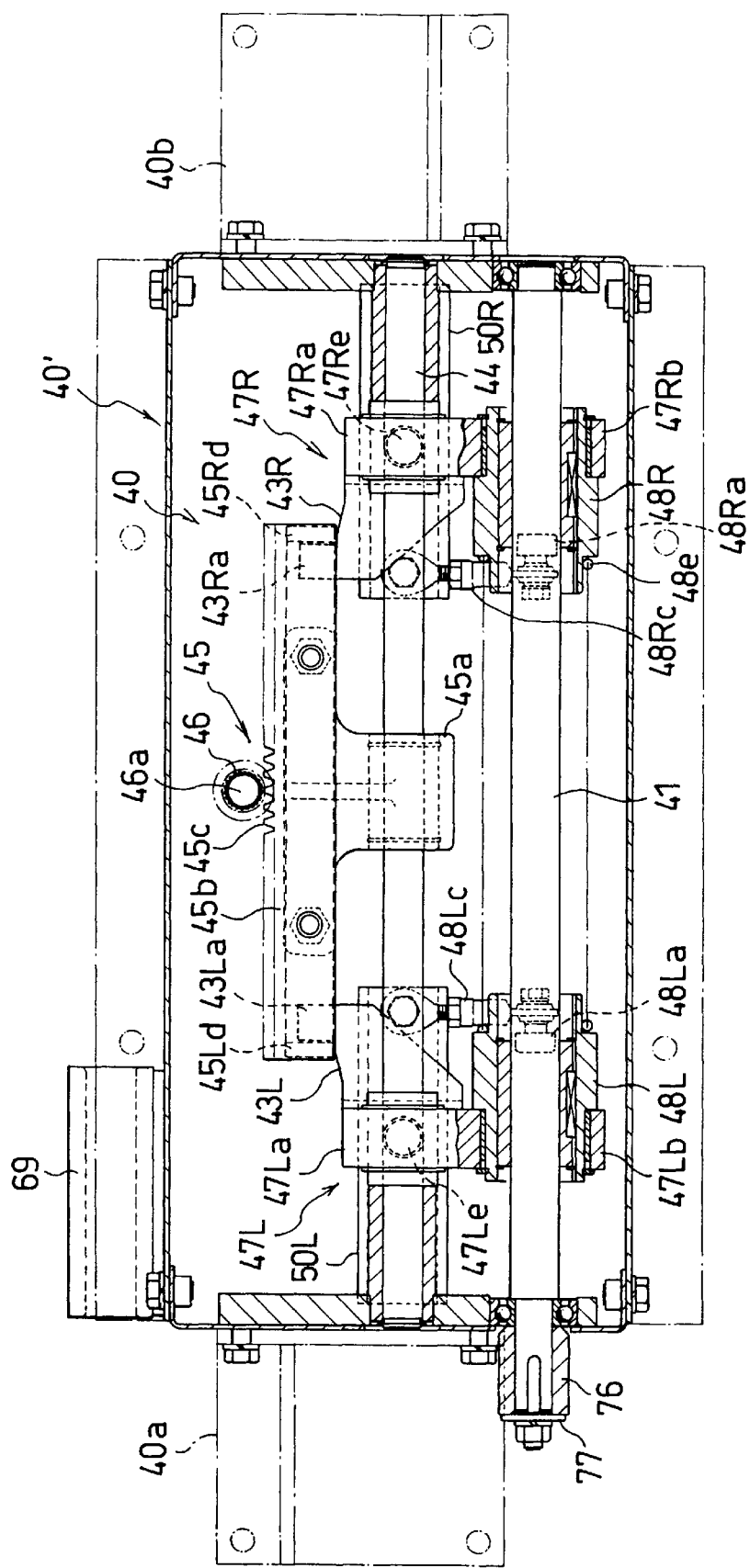
FIG. 13 is a plan view showing the structure of a pump operating unit.
Figure 14:
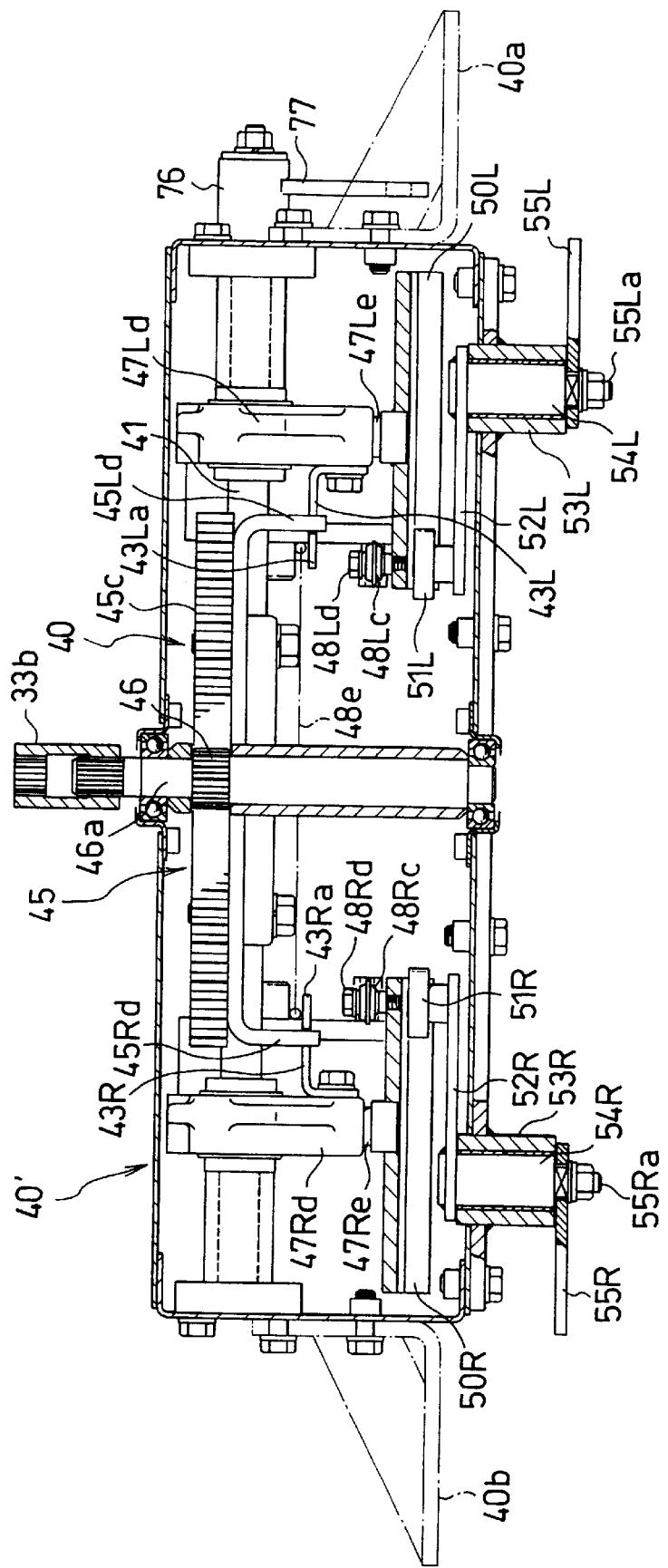
FIG. 14 is a front view showing the structure of the pump operating unit.
Figure 15:
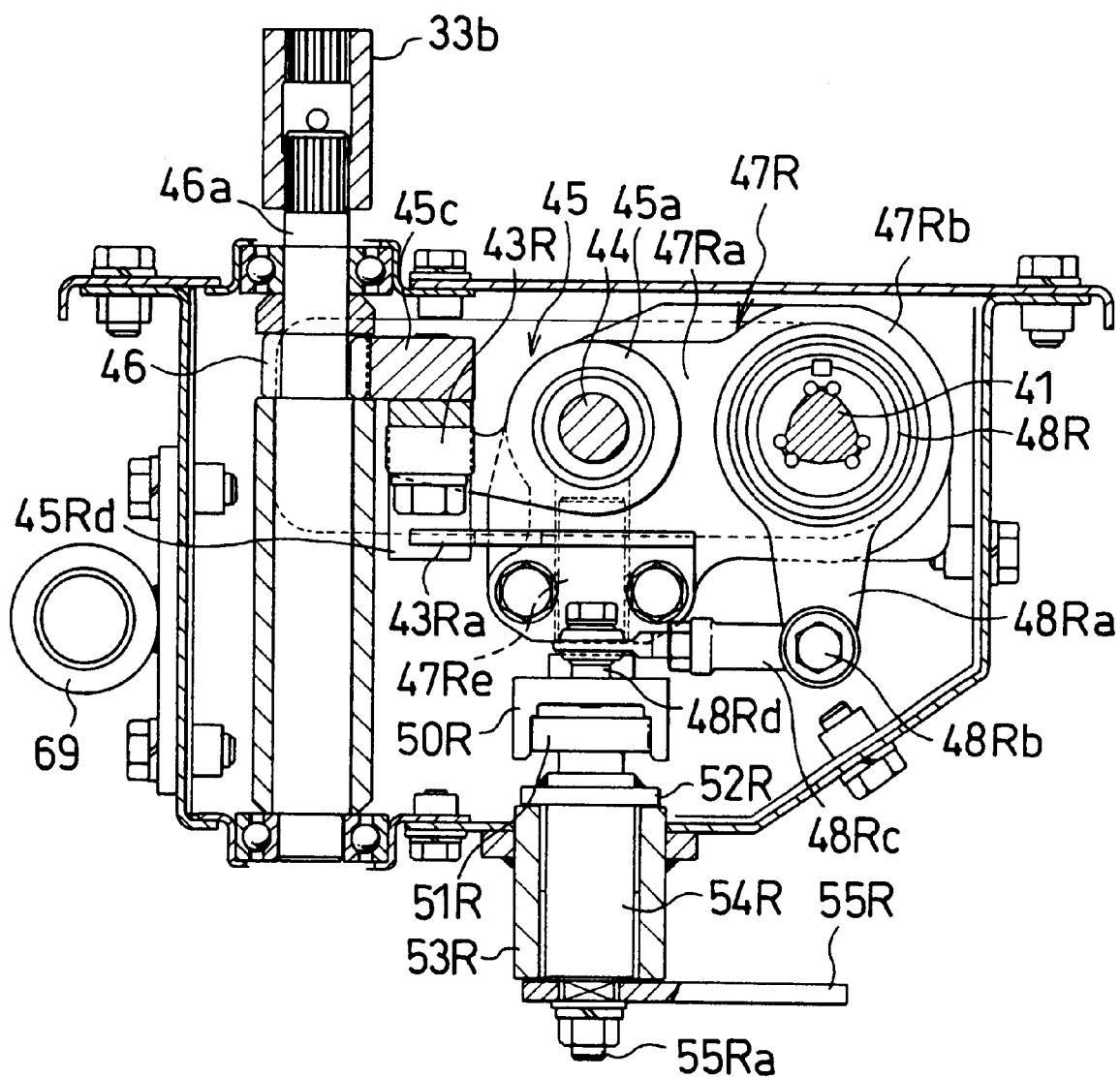
FIG. 15 is a side view showing the structure of the pump operating unit.

As shown in FIGS. 13 to 15, the pump operating unit 40 is disposed on the side of a slide shaft 44 located in front of the transmission shaft 41 in a triangular form in section and it is located in parallel to the transmission shaft 41. The slide shaft 44 is enveloped with a pair of left-hand and right-hand slide members 43L and 43R so as to be slidable in its axial direction and a transferring member 45 is interposed between left-hand and right-hand slide members 43L and 43R. The left-hand slide member 43L is connected to the left-hand spool link mechanism NL which in turn is connected to the left-hand spool control lever 100L of the variable flow rate control pumps PL. Likewise, the right-hand slide member 43R is connected to the right-hand spool link mechanism NR connected to the right-hand spool control lever 100R of the variable flow rate control pump PR. The left-hand spool link mechanism NL comprises a first connecting rod 56L, a first arm 86L, an intermediate shaft 87L, a second arm 88L, and the second connecting rod 89L, while the right-hand spool link mechanism NR comprises a first connecting rod 56R, a first arm 86R, an intermediate shaft 87R, a second arm 88R, and the second connecting rod 89R. The first connecting rod 56L is coupled to a link operating arm 55L as will be described hereinafter and the second connecting rod 89L is coupled to the left-hand spool control lever 100L of the variable flow rate control pump PL, while the first connecting rod 56R is coupled to a link operating arm 55R as will be described hereinafter and the second connecting rod 89R is coupled to the right-hand spool control lever 100R of the variable flow rate control pump PR.

Therefore, the pump operating unit 40 can operate the variable flow rate control pumps PL and PR by means of the left-hand and right-hand spool link mechanisms NL and NR, thereby controlling the steering operation of the left-hand and right-hand traveling sections 1L and 1R.

The transferring member 45 comprises a base part 45a mounted on the slide shaft 44 so as to be slidable in its axial direction and a main part 45b mounted integrally on the base part 45a and disposed immediately in front of the slide shaft 44. At both ends of the main part 45b are provided projecting abutment sections 45Ld and 45Rd, respectively, so as to abut with projection sections 43La and 43Ra of the slide members 43L and 43R. On the other hand, a rack 45c extending in left-hand and right-hand directions is fixed to the upper surface of the main part 45a.

The rack 45c is engaged with a pinion gear 46 which in turn is fixed to the pinion shaft 46a. The pinion shaft 46a is in turn connected through the coupling member 33b to the bottom end of the lower transmission shaft 33a of the steering wheel 29.

Thus, when the steering wheel 29 is turned to cause the pinion gear 46 to pivot, the rack 45c is allowed to slide to the left or right in a widthwise direction in association with the pivotal movement of the pinion gear 46, followed by accompanying the sliding of the transferring member 45 and transferring one of the slide members 43L and 43R, respectively, which in turn are engaged with the left-hand and right-hand side end portions of the transferring member 45.

The rack 45c can be detachably mounted on the main part 45b of the transferring member 45 and the pinion gear 46 can also be detachably mounted on the pinion shaft 46a.

Therefore, as a gear ratio of the rack 45c to the pinion gear 46 can be altered, the operator can obtain responsiveness to the steering operation in accordance with preferences.

On the outer circumferential surface of the left-hand slide member 43L is disposed a base end portion 47La of the guide support arm 47L so as to be movable and a rotation preventive member 47Lb is disposed protruding backwards from the base end portion 47La so as to slidably engage with the transmission shaft 41. Likewise, a base end portion 47Ra of the guide support arm 47R is disposed on the outer circumferential surface of the right-hand slide member 43R so as to be movable and a rotation preventive member 47Rb is disposed protruding backwards from the base end portion 47Ra so as to slidably engage with the transmission shaft 41. Reference symbols 48L and 48R denote each a boss portion connected adjacent to the respective rotation preventive members 47Lb and 47Rb.

On the other hand, the base end portion 47La is provided at its rear part with a boss portion 47Ld extending longitudinally. The upper end part of a support pin 47Le is disposed in the boss portion 47Ld with its axis directed longitudinally. Likewise, the base end portion 47Ra is provided at its rear part with a boss portion 47Rd extending longitudinally and the upper end part of support pin 47Re is disposed in the boss portion 47Rd with its axis directed longitudinally. A guide member 50L having an inverted U-shaped section and extending in a widthwise direction is mounted on the bottom end of the pin 47Le at the central part of the upper wall thereof so as to be pivotally movable and a guide member 50R having an identical configuration is mounted on the bottom end of the pin 47Re in substantially the same manner.

A swinging arm 48La is disposed at a bottom part of the boss portion 48L and a swinging arm 48Ra is disposed at a bottom part of the boss portion 48R. The swinging arm 48La is connected at its bottom end to the top end portion of a swinging link 48Lc, while it is connected at its front end to and supports an upper portion of the guide member 50L. Likewise, the swinging arm 48Ra is connected at its bottom end to the top end portion of a swinging link 48Rc and it is connected at its front end to and supports an upper portion of the guide member 50R. Reference symbols 48Lb, 48Rb, 48Ld and 48Rd denote each a connecting pin, and reference symbol 48e denotes a spring for returning the transferring member interposed between a pair of the left-hand and right-hand boss portions 48L and 48R to its neutral position.

The guide members 50L and 50R are each in an inverted U-shaped form in section and they are disposed so as to hold rotary members 51L and 51R, respectively, so as to be rotatable in their depressed parts. The rotary member 51L is coupled to a link operating arm 55L through a support arm 52L for supporting the rotary member 51L. The base end of the link operating arm 55L is mounted on the bottom end of an arm support shaft 54L and 54R which extends longitudinally and is held with the bottom wall of the casing 40' through a boss portion 53L. On the other hand, the support arm 52L is mounted at the base end thereof on the topside end of the arm support shaft 54L and the rotary member 51L is mounted on the topside end of the support arm 52L. On the other hand, the rotary member 51R is likewise coupled to a link operating arm 55R through a support arm 52R for supporting the rotary member and the base end of the link operating arm 55R is mounted on the bottom end of a longitudinally extending arm support shaft 54R held with the bottom wall of the casing 40' through a boss portion 53R. Further, the base end of the support arm 52R is mounted on the topside end of the arm support shaft 54R and the rotary member 51R is mounted on the topside end of the support arm 52R.

Further, the link operating arm 55L is disposed extending in the direction opposite to the direction in which the support arm 52L extends, with respect to the arm support shaft 54L. Likewise, the link operating arm 55R is disposed extending in the direction opposite to the direction in which the support arm 52R extends, with respect to the arm support shaft 54R. Moreover, the rotary member 51L mounted on the topside end of the support arm 52L is disposed so as to pivot about the arm support shaft 54L while sliding in the depressed part of the guide member 50L, and the topside end of the link operating arm 55L is allowed to pivot about the arm support shaft 54L up to the position point-symmetrically to the rotary member 51L, in association with the pivotal movement action of the rotary member 51L. Likewise, the rotary member 51R mounted on the topside end of the support arm 52R is disposed so as to pivot about the arm support shaft 54R while sliding in the depressed part of the guide member 50R, and the topside end of the link operating arm 55R is allowed to pivot about the arm support shaft 54R up to the position point-symmetrically to the rotary member 51R.

Then, the link operating arm 55L is coupled to the spool control lever 100L through the left-hand spool link mechanism NL. Likewise, the link operating arm 55R is coupled to the spool control lever 100R through the right-hand spool link mechanism NR.

Further, the left-hand spool link mechanism NL comprises the first connecting rod 56L, the first arm 86L, the intermediate shaft 87L, the second arm 88L, and the second connecting rod 89L, while the right-hand spool link mechanism NR comprises the first connecting rod 56R, the first arm 86R, the intermediate shaft 87R, the second arm 88R, and the second connecting rod 89R. Reference symbols 55La, 55Ra, 56La and 56Ra denote each a connecting pin, and reference numeral 130 denotes a stay.

The left-hand first connecting rod 56L is generally equal in length to the right-hand first connecting rod 56R. Also, the left-hand second connecting rod 89L is generally equal in length to the right-hand second connecting rod 89R.

Therefore, upon steering the steering wheel 29, the left-hand first connecting rod 56L can be operated in the same amount as the right-hand first connecting rod 56R and, likewise, the left-hand second connecting rod 89L can be operated in the same amount as the right-hand second connecting rod 89R.

In the configuration as described above, the turning of the steering wheel 29 slides the transferring member 45 and one of the slide members 43L and 43R is transferred along the slide shaft 44 and the transmission shaft 41, thereby sliding the corresponding guide member 50L or 50R disposed integrally with the respective slide member 43L or 45R.

Then, as the transmission shaft 41 is caused to pivot with the lever 30 for shifting the forward and backward traveling and for adjusting the speed of the machine, the left-hand guide member 50L is allowed to pivot in a to-and-fro direction about the support pin 47Le by means of the swinging links 48Lc connected to the slide member 43L and the link operating arm 55L is allowed to pivot about the arm support shaft 54L. On the other hand, the right-hand guide member 50R is likewise allowed to pivot in a to-and-fro direction about the support pin 47Re by means of the swinging link 48Rc connected to the slide member 43R, thereby allowing the link operating arm 55R to pivot about the arm support shaft 54R.

Then, a description will be made of the movements of the left-hand and right-hand guide members 50L and 50R upon operating the steering wheel 29 and the lever 30 for shifting the forward and backward traveling and for adjusting the speed of the machine, with reference to FIGS. 16 to 19.

Figure 16:
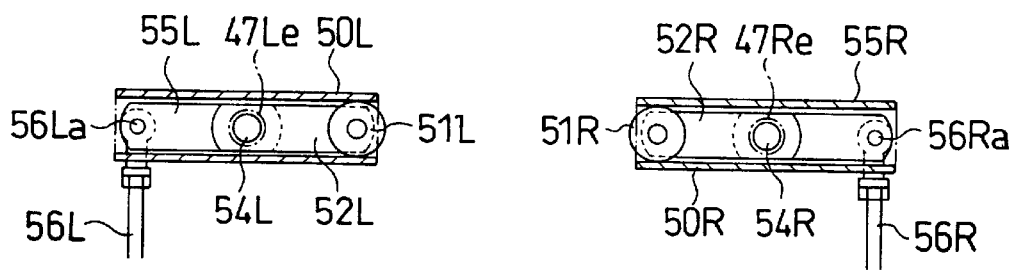
FIG. 16 is a partial front view showing the pump operating unit in a neutral state.

When the lever 30 for shifting the forward and backward traveling and for adjusting the speed of the machine are held in its neutral position and the steering wheel 29 of a rotary type is held in its neutral position concurrently therewith, the left-hand guide member 50L, the support arm 52L and the link operating arm 55L are held in a horizontal posture, as well as the right-hand guide members 50R, the support arm 52R, and the link operating arm 55R are likewise held in a horizontal posture, as shown in FIG. 16.

Figure 17:
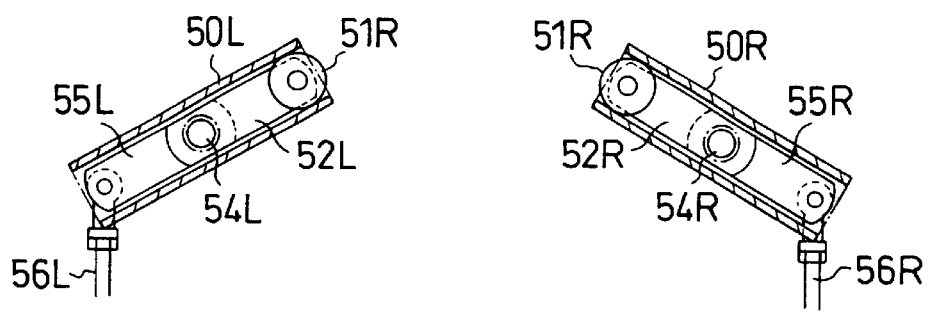
FIG. 17 is a partial front view showing the pump operating unit in a forward-traveling state.

Then, as shown in FIG. 17, the left-hand rotary member 51L is operated so as to incline the support arm 52L, the arm support shaft 54L and the link operating arm 55L, thereby assuming an inclined posture. Likewise, the right-hand rotary member 51R is operated so as to incline the support arm 52R, the arm support shaft 54R and the link operating arm 55R, thereby assuming an inclined posture, as indicated on the right-hand side in FIG. 17.

In this instance, the left-hand and right-hand cam plates 101 and 102 controlling the left-hand and right-hand hydraulic motors ML and MR for the left-hand and right-hand travelling sections assume the angle of inclination identical to each other, thereby allowing the left-hand and right-hand traveling sections 1L and 1R to move forwards at an identical speed to travel forwards in the straight direction.

When the steering wheel 29 is turned to the left from the above straight forward travelling status to implement the left-hand turn operation, the pinion shaft 46a is caused to pivot, thereby transferring the rack 45c engaged with the pinion gear 46 to the right. Then, the transferring member 45 pulls the left-hand slide member 43L to the right, together with the rack 45c, and transfer it to the right.

Figure 18:
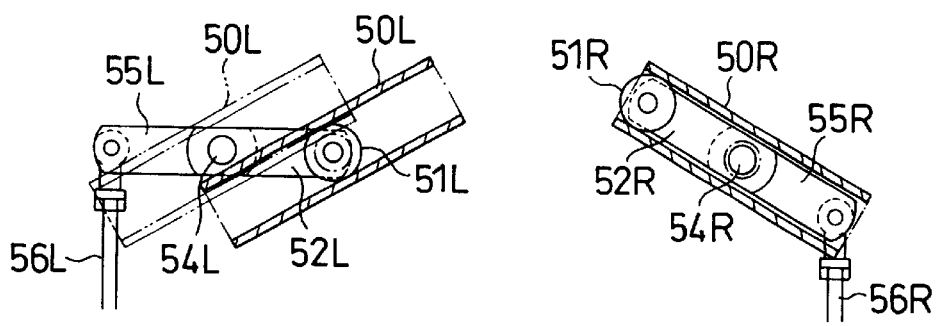
FIG. 18 is a partial front view showing the pump operating unit in a state of pivotally turning to the left.

The left-hand guide member 50L is then allowed to transfer to the right integrally with the left-hand slide member 43L and slides to the right while it is stayed in its inclined posture. In this instance, as shown in FIG. 18, the rotary member 51L engaged with the left-hand guide member 50L is transferred downwards to be located in a generally central portion of the left-hand guide member 50L.

Therefore, the left-hand support arm 52L and the left-hand link operating arm 55L are caused to pivot to become nearly in a horizontal posture, thereby causing the left-hand cam plate 98 for controlling the hydraulic motor ML for the left-hand travelling section to approach to its neutral position by means of the spool link mechanism NL and the left-hand cam plate angle control unit 136L.

In this instance, as the speed of the left-hand travelling section 1L is decelerated or ceased while the right-hand travelling section 1R continues travelling at its original speed, the machine is allowed to gradually turn to the left or make a left-hand pivot turn.

Figure 19:
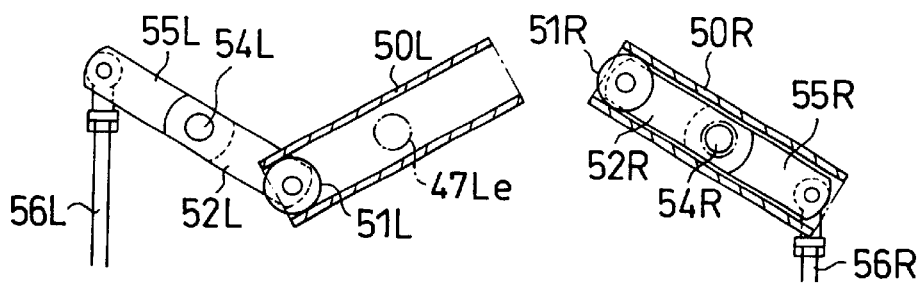
FIG. 19 is a partial front view showing the pump operating unit in a state of spin-turning to the left.

Then, as the steering wheel 29 is further turned to the left from the left-hand turning state as described above, the left-hand guide member 50L is caused to slide further to the right while it is sustaining its inclined status. In this instance, the left-hand rotary member 51L assumes the state in which it is transferred to the position on the left-hand side portion of the left-hand guide member 50L, as shown in FIG. 19, and the left-hand support arm 52L and the left-hand link operating arm 55L assume each the inclined state in which the right-hand side is inclined downwards to the right, thereby causing the left-hand cam plate 98 to incline toward the side for controlling the backward travelling.

In this instance, the left-hand travelling section 1L is traveled backwards, while the right-hand travelling section 1R continues travelling forwards, thereby allowing the machine to make a spin turn to the left.

Figure 20:
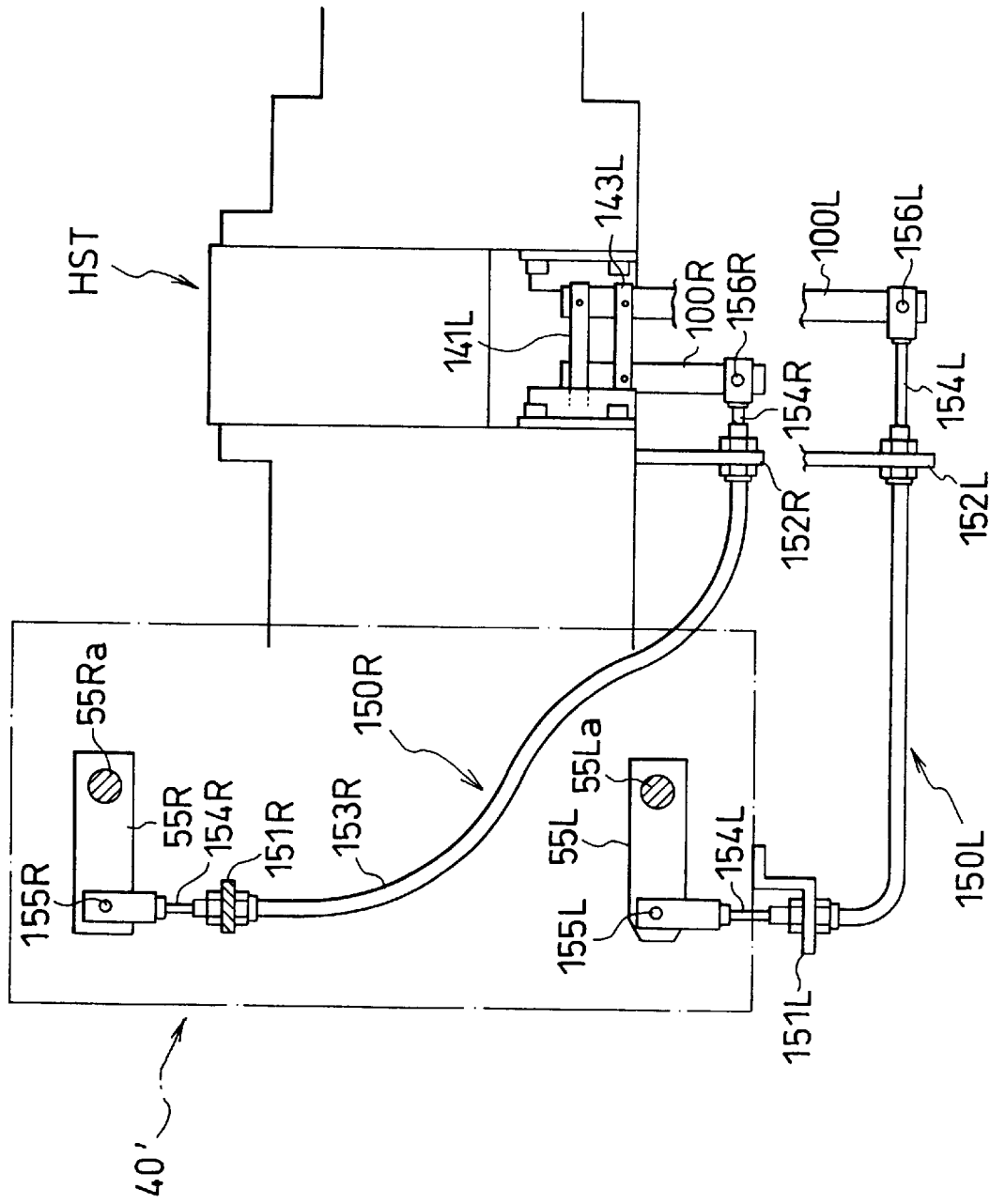
FIG. 20 is a plan view showing a spool link mechanism according to another embodiment of the present invention.

FIG. 20 shows another embodiment of spool link mechanisms NL and NR. In this embodiment, a flexible feedback wire 150L is interposed between the link operating arm 55L and the spool control lever 100L, and a flexible feedback wire 150R is interposed between the link operating arm 55R and the spool control lever 100R.

More specifically, the feedback wire 150L is disposed so as to connect the end portion of the link operating arm 155L to the end portion of the spool control lever 100L via an inner wire 154L which in turn is enveloped with an outer wire 153L over its entire length except at its side end portions. The both ends of the outer wire 153L are supported with outer wire stays 151L and 152L. On the other hand, the feedback wire 150R is likewise disposed so as to connect the end portions of the link operating arm 55R to the end portion of the spool control lever 100R via an inner wire 154R which in turn is enveloped with an outer wire 154R over its entire lengths except at their side end portions. The both ends of the outer wire 153R are supported with outer wire stays 151R and 152R. Reference symbols 155L, 155R, 156L and 156R denote each a connecting pin.

In this configuration, as the link operating arm 55L is coupled to the spool control lever 100L with the flexible feedback wire 150L and the link operating arm 55R is likewise coupled to the spool control lever 100R with the flexible feedback wire 150R, a space in which the flexible feedback wires 150L and 150R are disposed can be made compact. Further, the amounts of operation of the link operating arms 55L and 55R can be transmitted with a high degree of certainty to the spool control lever 100L and the spool control lever 100R to ensure a precise control over acceleration or deceleration of the variable flow rate control pumps PL and PR, respectively.

Figure 21:
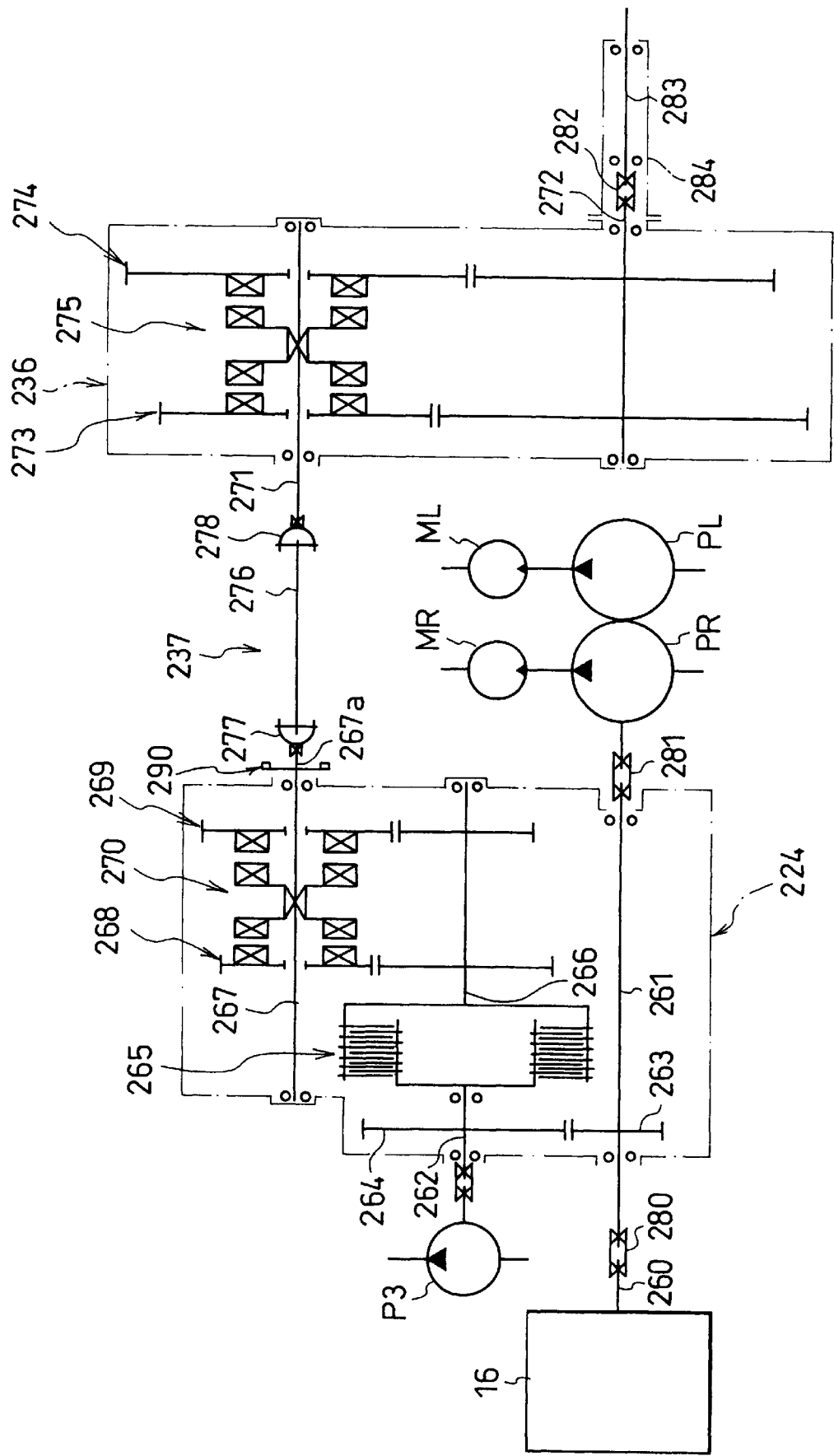
FIG. 21 is a diagram describing the manner of transmitting power.

Turning now to FIG. 21, the engine 16 is coupled to a front side transmission section 224 which in turn is coupled to a pair of the variable flow rate control pumps PL and PR and to the hydraulic pump P1 for lifting or lowering a working machine and the charge pump P2 disposed before and behind it. To the front side transmission section 224 is coupled via a transmission mechanism 237 a back side transmission section 236 disposed at the rear portion of the machine body frame 3.

As shown in FIG. 21, the front side transmission section 224 has an extension shaft 261 disposed latitudinally so as to connect an output shaft 260 of the engine 16 to the variable flow rate control pumps PL and PR and a power shaft 262 disposed latitudinally in parallel to the extension shaft 261. An output gear 263 mounted at the front end portion of the extension shaft 261 is in mesh with an input gear 264 mounted at the front end portion of the power shaft 262. On the backside end portion of the power shaft 262 is mounted a hydraulic clutch unit 265 from which a deceleration shaft 266 is disposed extending backwards. An accessory shaft 267 is also disposed latitudinally in parallel to the deceleration shaft 266. An acceleration gear train 268 and a deceleration gear train 269 are interposed between the deceleration shaft 266 and the accessory shaft 267, thereby allowing the acceleration gear train 268 and the deceleration gear train 269 to be shifted with a manually operable dog clutch 270 to permit a two-stage transmission. Reference numerals 280 and 281 denote each a coupling, and reference symbol P3 denotes a charge pump.

On the other hand, as shown in FIG. 21, the back side transmission section 236 has a main shaft 271 disposed latitudinally in parallel to a power pickup shaft 272. Between the main shaft 271 and the power pickup shaft 272 are interposed an acceleration gear train 268 and a deceleration gear train 269 so as to be shifted with a manually operable dog clutch 275, thereby permitting a two-stage transmission.

Further, as shown in FIG. 21, the transmission mechanism 237 comprises an intermediate shaft 276 which is coupled to and interposed between the accessory shaft 267 of the front side transmission section 224 and the main shaft 271 of the back side transmission section 236 through universal joints 277 and 278, respectively.

In the manner as described above, the rotating power of the output shaft 260 of the engine 16 can be transmitted to the power pickup shaft 272 by transmission eventually into four speed stages, i.e. by transmission into two speed stages with the front side transmission section 224 and then by transmission further into two speed stages with the backside transmission section 236.

The backside end portion of the power pickup shaft 272 is provided with a spline 282 as shown in FIG. 21. The spline 282 allows the power pickup shaft 272 to be detachably coupled to a drive shaft 283 for a rotary cultivating machine B simply by inserting or pulling the spline 282. Reference numeral 284 denotes a covering for the drive shaft.

Figure 22:
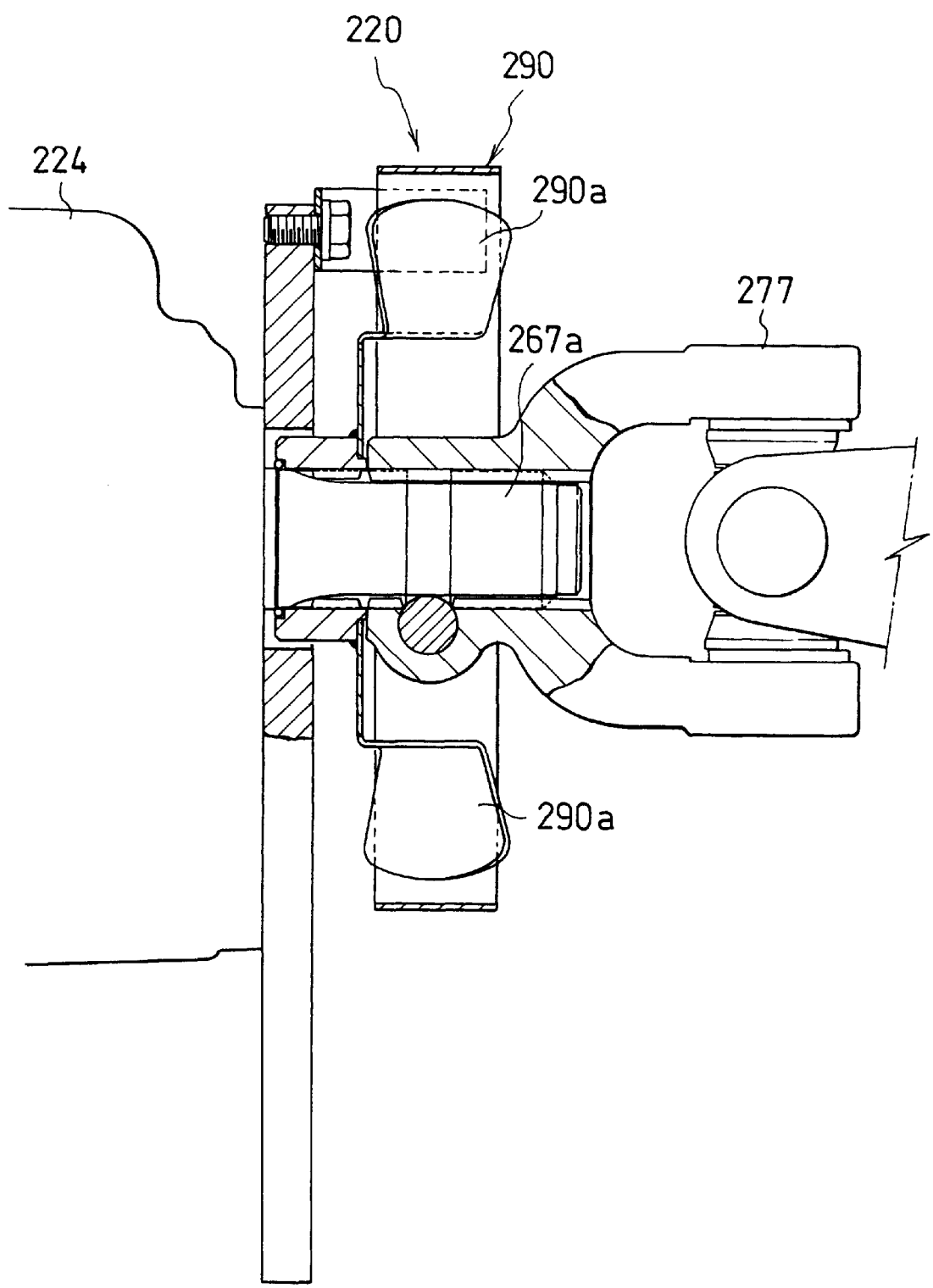
FIG. 22 is a side view showing a configuration of mounting a cooling fan.
Figure 23:
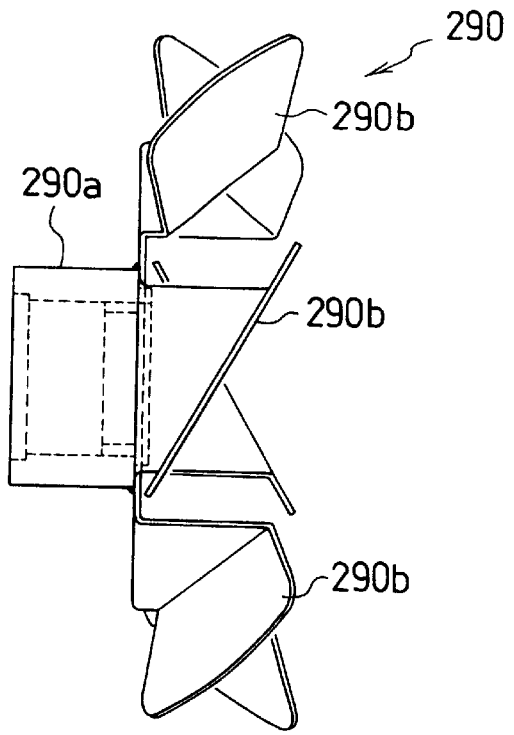
FIG. 23 is a side view showing the cooling fan.
Figure 24:
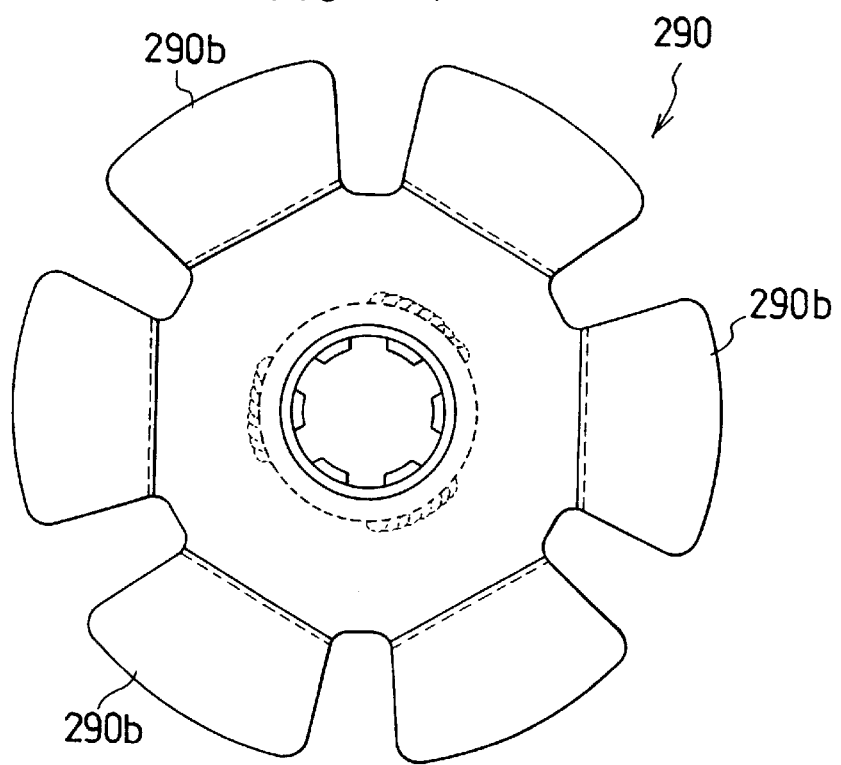
FIG. 24 is a front view showing the cooling fan.

Moreover, as shown in FIG. 21, a cooling fan 290 is mounted on an outer side end portion 267a of the accessory shaft 267 for the front side transmission section 224. More specifically, as shown in FIGS. 22 to 24, the cooling fan 290 has a boss portion 290a thereof spline-engaged with an outer side end portion 267a of the accessory shaft 267, thereby allowing the main fan body 290a mounted integrally on the periphery of the boss portion 290a to rotate integrally with the accessory shaft 267. Reference numeral 220 denotes a fan protective cover for protecting the fan.

In the configuration as described above, the cooling fan 290 is rotated during the transmission of the power from the accessory shaft 267 through the universal joint 277, the intermediate shaft 276 and the universal joint 278 to the main shaft 271, thereby allowing the front side transmission section 224 to cool and decreasing the ambient temperature.

Figure 25:
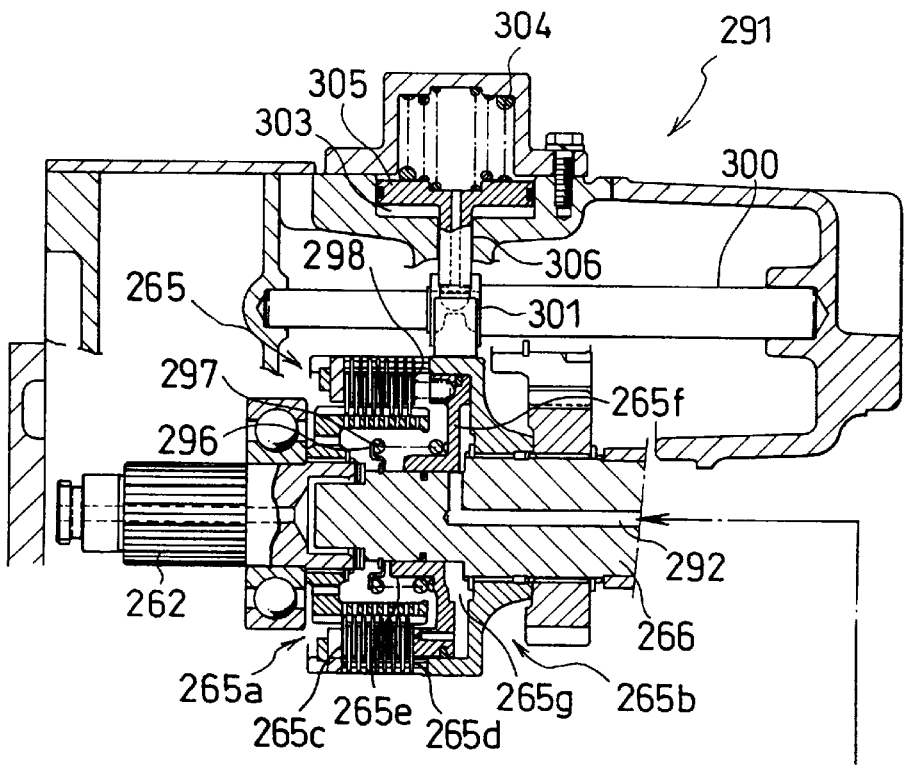
FIG. 25 is a sectional view showing a hydraulic clutch unit and a hydraulic brake device.
Figure 25:
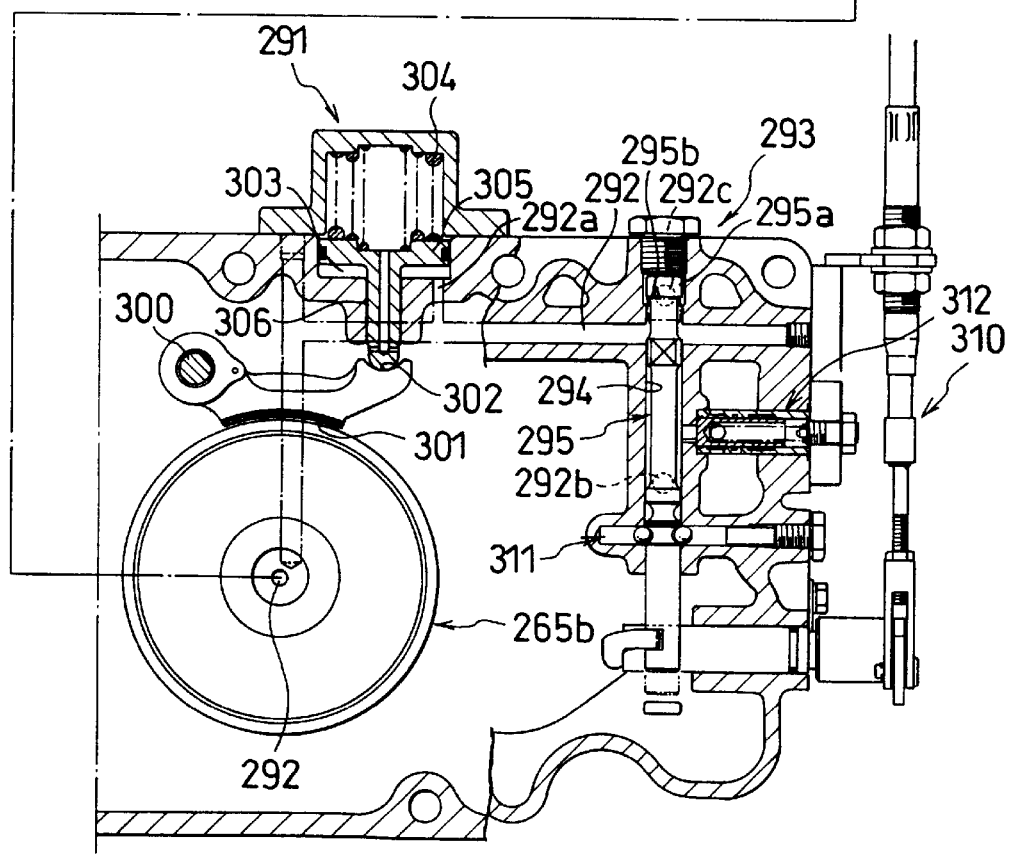

As shown in FIG. 25, the hydraulic clutch unit 265 and a hydraulic brake device 291 are mounted on the deceleration shaft 266 disposed in the front side transmission section 224. To the hydraulic clutch unit 265 and the hydraulic brake device 291 is connected each a pilot oil path 292 for feeding pilot oil in series. At an intermediate portion of the pilot oil path 292 is provided a path change-over valve 293.

More specifically, as shown in FIG. 25, the hydraulic clutch unit 265 is configured in such a manner that an inner multi-plate support member 265a is mounted on the power shaft 262 and an outer multi-plate support member 265b is mounted on the deceleration shaft 266. Then, the outer multi-plate support member 265b is superimposed on the inner multi-plate support member 265a and a number of friction plates 265c and 265d greater than those of the respective inner multi-plate support member 265a and outer multi-plate support member 265b are disposed protruding so as to be superimposed in the axial direction. On the deceleration shaft 266 is mounted a member 265e for acting upon a friction plate so as to be slidable and a pilot oil chamber 265g is formed between a flange part 265f of the friction plate acting member 265e and the outer multi-plate support member 265b. The end portion of the pilot oil path 292 formed in the deceleration shaft 266 is disposed communicating with the pilot oil chamber 265g, and a declutching spring 297 is interposed between the friction plate acting member 265e and a spring recipient member 296 mounted on an outer peripheral surface at an intermediate part of the deceleration shaft 266. Reference numeral 298 denotes a spring for pressing a friction plate.

In the configuration as described above, when pilot oil is fed to the pilot oil chamber 265g through the pilot oil path 292, the member 265e for acting upon the friction plate is caused to slide toward the friction plates 265c and 265d in resistance to the biasing force of the declutching spring 297. Then, the member 265e for acting upon the friction plate presses the friction plates 265c and 265d to assume a clutch-connected state. On the other hand, when the pilot oil is discharged from the pilot oil chamber 265g through the pilot oil path 292, the member 265e for acting upon the friction plate is caused to slide in the direction in which it departs from the friction plates 265c and 265d due to the biasing force of the declutching spring 297, thereby assuming a declutched state.

Further, as shown in FIG. 25, the hydraulic brake device 291 has an inner brake member 301 disposed immediately above the outer multi-plate support member 265a of the hydraulic clutch unit 265 and the inner brake member 301 is supported at its base part with a support shaft 300. The inner brake member 301 is disposed at its bottom surface so as to abut with or detach from the outer peripheral surface of the outer multiplate support member 265a. At the topside end portion of the inner brake member 301 is formed a rod recipient section 302 and a cylinder section 303 is disposed immediately above the rod recipient section 302. In the cylinder section 303 is disposed a piston 305 biased downwards with a braking spring 304, and the piston 305 is connected to the topside end of a piston rod 306. The bottom end portion of the piston rod 306 extending in a vertically downward direction is disposed in the position close to the rod recipient section 302.

Further, as shown in FIG. 25, the cylinder section 303 is connected to an end portion of a branch pilot oil path 292a branched from an intermediate portion of the pilot oil path 292.

Moreover, the size of the branch pilot oil path 292a is configured so as to become smaller than that of the pilot oil path 292 to thereby form a throttle part.

In the configuration as described above, when the pilot oil is fed to the cylinder section 303 through the branch pilot oil path 292a, then the piston 305 is caused to elevate in resistance to the pressing and biasing force of the braking spring 304, thereby releasing the pressing of the inner brake member 301 via the piston rod 306 and releasing the braking operation.

On the other hand, when the pilot oil is discharged from the cylinder section 303 through the branch pilot oil path 292a, then the piston 305 is caused to lower with the braking spring 304, thereby pressing the inner brake member 301 onto the outer peripheral surface of the outer multi-plate support member 265a through the piston rod 306 and coming into a braked state in which the rotation of the deceleration shaft 266 is ceased.

As shown in FIG. 25, the path change-over valve 293 is configured such that a spool 295 is inserted in a main valve body 294 so as to be slidable in a vertical direction and the bottom end portion of the spool 295 is coupled to a lever 82 for switching the pickup of the power disposed in the operation section M through an operation mechanism 310. In the drawing, reference numeral 311 stands for a detent section, reference numeral 312 for a relief valve, reference symbol 292b for a pilot oil feed hole, and reference symbol 292c for a pilot oil discharge hole.

In this configuration, when the lever 82 is shifted to pick up the power, the spool 295 is caused to lower and the pilot oil is fed from the charge pump P3 through the pilot oil feed hole 292b to the pilot oil path 292, thereby connecting the hydraulic clutch unit 265 and releasing the braking operation of the hydraulic brake device 291.

On the other hand, when the lever 82 is shifted to discontinue the pickup of the power, the spool 295 is caused to elevate to discharge the pilot oil from the pilot oil path 292 through the pilot oil discharge hole 292c, thereby declutching the hydraulic clutch unit 265 and braking the hydraulic brake device 291.

Figure 26:
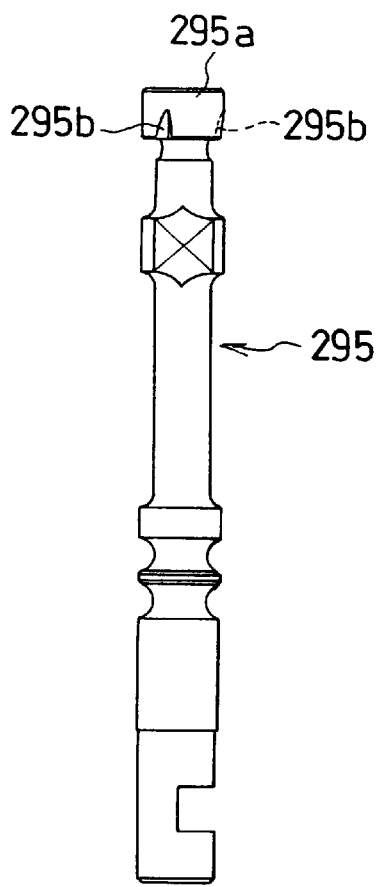
FIG. 26 is a front view showing a spool.
Figure 27:
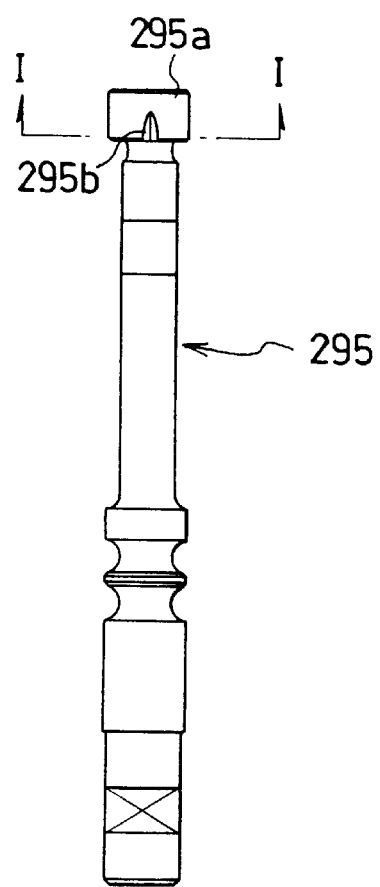
FIG. 27 is a side view showing the spool.
Figure 28:
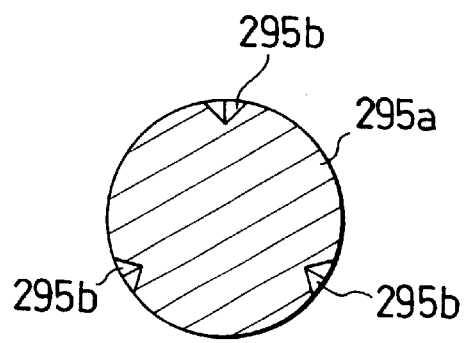
FIG. 28 is a sectional view taken along line I—I of FIG. 27.

Furthermore, as shown in FIGS. 26 and 27, a land portion 295a of the spool 295 at a lower half section of the outer peripheral surface thereof is provided with three communicating passages 295b, 295b and 295b each by cutting away a sectionally V-shaped communicating groove in a trilaterally-pyramid form in the axial direction in each of the areas in which the outer peripheral surface thereof is divided into three equal sections.

Therefore, a portion of the pilot oil to be fed to the pilot oil chamber 265g of the hydraulic clutch unit 265 is gradually discharged through the communicating passages 295b, 295b and 295b before the path is allowed to be thoroughly shifted with the land portion 295a of the spool 295 upon sliding the spool 295 downwards by operating the lever 82 for shifting the pickup of the power.

As a consequence, the amount of the pilot oil to be fed to the pilot oil chamber 265g can be decreased by the amount of the pilot oil discharged until the passage is shifted completely, and as the amount of the pilot oil is allowed to increase gradually as the amount of the oil discharged decreases, the hydraulic clutch unit 265 allows the friction plate acting member 265e to act on the friction plates 265c and 265d gradually and to connect the clutches slowly.

Further, as the pilot oil is fed to the cylinder section 303 of the hydraulic brake device 291 in a gradually increasing amount, the hydraulic brake device 291 causes the piston 305 to elevate slowly and release the braking operation gradually.

Upon shifting the passages by sliding upwards the spool 295 by operating the lever 82 for shifting the pickup of the power, the pilot oil is discharged gradually from the pilot oil chamber 265g of the hydraulic clutch unit 265 through the communicating passages 295b, 295b and 295b before the paths are thoroughly switched with the land portion 295a of the spool 295.

As a result, the hydraulic clutch unit 265 can release the action of the friction plate acting member 265e upon the friction plates 265c and 265d, thereby declutching the hydraulic clutch unit 265 gradually.

Further, the pilot oil is gradually discharged from the cylinder section 303 of the hydraulic brake device 291 and the hydraulic brake device 291 allows the piston 305 to lower slowly to brake the brake device gradually.

In the manner as described above, as the pilot oil is allowed to flow through the communicating passages 295b, 295b and 295b before the completion of the switching of the paths with the path change-over valve 293, the hydraulic clutch unit 265 and the hydraulic brake device 291 can be operated in a smooth way and at a good timing, thereby ensuring a sure transmission operation of the deceleration shaft 266 and a sure cessation of the rotation thereof.

In this instance, as the branch pilot oil path 292a connected to the cylinder section 303 of the hydraulic brake device 291 is provided with the throttle part having a size smaller than the size of the power pickup shaft 272 connected to the pilot oil chamber 265g of the hydraulic clutch unit 265, the flow of the pilot oil into or from the hydraulic brake device 291 can be delayed. Therefore, the braking action or the releasing action of the braking with the hydraulic brake device 291 can be carried out with a time lag for the clutching action or the declutching action of the hydraulic clutch unit 265.

More specifically, the hydraulic brake device 291 starts the braking action after the hydraulic clutch unit 265 has started the declutching action and the braking action is to be completed after the declutching action has been finished.

On the other hand, the hydraulic brake device 291 starts the brake releasing action after the hydraulic clutch unit 265 has started the clutching action and the brake releasing action is to be completed after the clutching action has been finished.

As a consequence, the hydraulic clutch unit 165 and the hydraulic brake device 291 can be operated in a smooth way and at a good timing.

It is to be understood that in this embodiment three of the communicating passages 295b are provided in the land portion 295a of the spool 295; however, the number of the communicating passages is not restricted to three and a sectional shape and a size of the communicating passage 295b can be set in an appropriate fashion.

Figure 29:
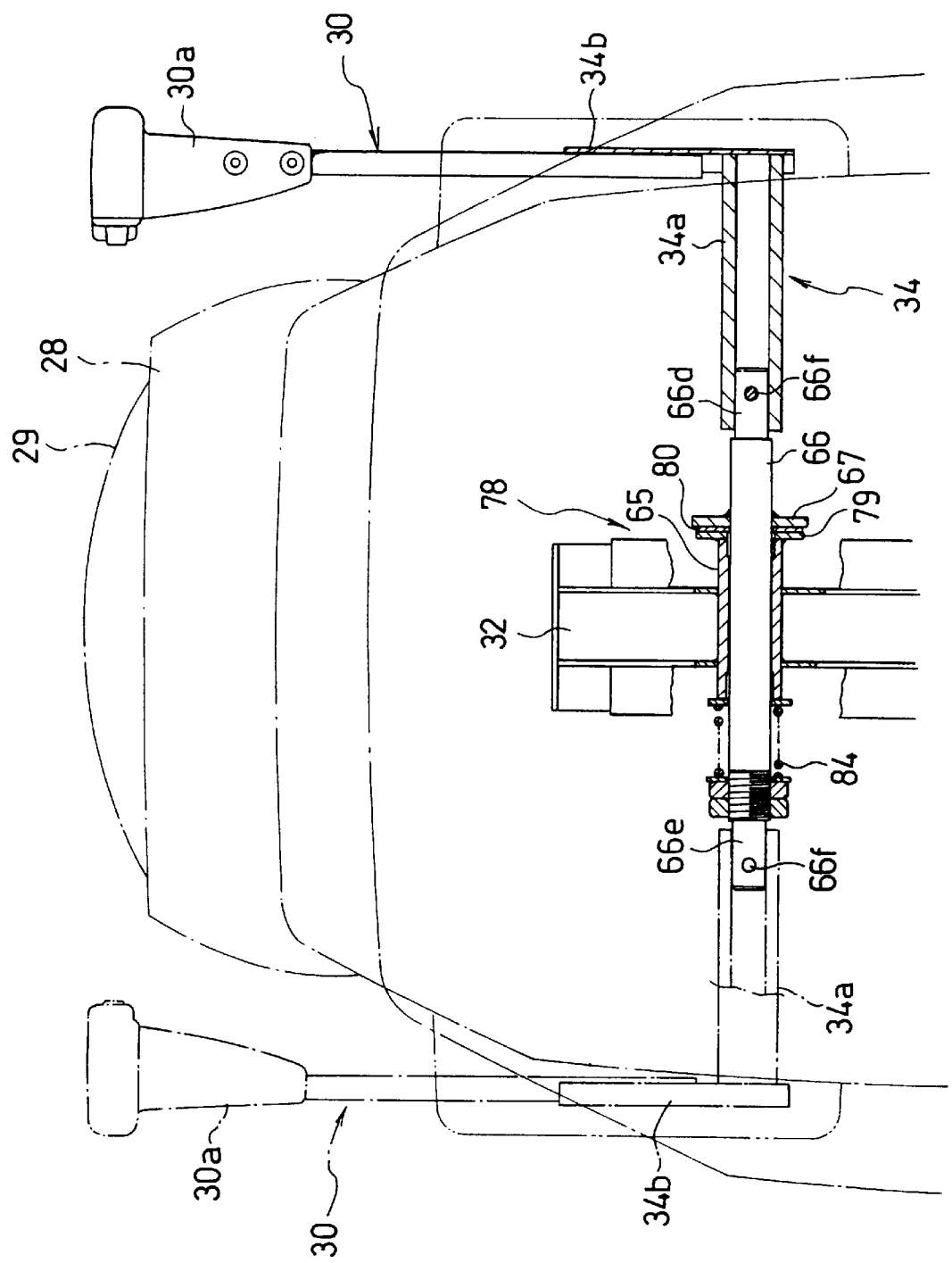
FIG. 29 is a front view describing the structure of mounting a lever for shifting forward and backward movements and adjusting the speed of the travelling sections according to a further embodiment of the present invention.

FIG. 29 shows a structure of mounting the lever 30 for shifting the forward and backward traveling and for adjusting the speed of the machine in accordance with another embodiment of the present invention. A lever support shaft 66 inserted in a shaft support pipe 65 is provided with left-hand and right-hand lever mounting portions 66d and 66e symmetrically at its left-hand and right-hand end portions, respectively. On either one of the left-hand and right-hand lever mounting portions 66d and 66e can be mounted the lever 30 for shifting the forward and backward traveling and for adjusting the speed of the machine through a connecting member 34 which in turn is disposed each on the left-hand and right-hand sides of the lever support shaft 66. The connecting member 34 is disposed extending in left-hand and right-hand directions and comprises a connecting pipe 34a and a lever mounting part 34b. The connecting pipe 34a for one connecting member 34 is disposed so as to allow its inside end portion to be engageable with the lever mounting portion 66d. Likewise, he connecting pipe 34a for the other connecting member 34 is disposed so as to allow its inside end portion to be engageable with the lever mounting portion 66e. The lever mounting part 34b for each connecting member 34 is mounted so as to extend upwardly from the outside end of the connecting pipe 34a. Either one of the left-hand and right-hand lever mounting portions 66d and 66e is engaged with the inside end portion of the connecting pipe 34a of the connecting member 34 and it is fixed with a fixing pin 66f so as to be inserted into or pulled out in the direction intersecting at a right angle the axis of each of the left-hand and right-hand lever mounting portions 66d and 66e.

In the configuration as described above, the lever 30 for shifting the forward and backward traveling and for adjusting the speed of the machine can be mounted on either of the left-hand and right-hand sides of the steering wheel 29 selectively in accordance with the preferences of the operator.

INDUSTRIAL UTILIZABILITY (1) The hydraulically travelling agricultural machine in accordance with the present invention is provided with the spool link mechanism interposed between the pump operating unit and a pair of the variable flow rate control pumps so that the inherent vibration caused to occur in the variable flow rate control pump is absorbed with the spool link mechanism, thereby decreasing the transmission of the vibration to the pump operating portion and enabling a prevention of the propagation of the vibration to the steering mechanism and the speed changing mechanism connected to the pump operating unit.

Therefore, the operator can prevent a mistake in operating the steering mechanism and the speed changing mechanism, thereby improving operability of the machine.

(2) Also, the hydraulically travelling agricultural machine according to the present invention is configured such that the steering wheel in a circle-shaped form is disposed above the pump operating unit so as to operate the steering wheel. This configuration allows the vibration caused during travelling the machine to be absorbed by the pump operating unit and a portion of the steering mechanism and only the reduced vibration that does not adversely affect the operability of the steering wheel mounted on the topside end of the steering mechanism can be transmitted. As a consequence, the operator can prevent a mistake in operating the steering wheel and improve the operability of the machine body.

Further, as the acceleration and deceleration operations of the variable flow rate control pumps can be done via the pump operating unit and the spool link mechanism by operating the steering wheel, the load of operation can be made smaller and, in this respect, too, the operability of the machine can be improved.

(3) Further, the hydraulically travelling agricultural machine in accordance with the present invention is configured such that a pair of the variable flow rate control pumps are provided each with a cam plate angle control unit for controlling the cam plate of the variable flow rate control pump and the cam plate angle control unit comprises the cam plate operating shaft, the servo cylinder connected to the cam plate operating shaft, the spool inserted in the servo cylinder, the spool control lever with its base end portion side connected to the spool and its topside end portion side connected to the spool link mechanism, the support shaft for supporting an intermediate portion of the spool control lever on the machine frame, and the connecting rod disposed at the end of the spool link mechanism for connection with the spool. Therefore, this configuration of the variable flow rate control pumps can permit a smooth control of the flow rate of the variable flow rate control pumps through the cam plate angle control unit upon conducting the steering operation and the speed changing operation with the operating section, thereby ensuring the acceleration and deceleration of the left-hand and right-hand travelling sections with the hydraulic motors for the left-hand and right-hand travelling sections and carrying out the steering and speed changing operation of the machine in a smooth way. This can also improve the operability of the machine.

Moreover, the spool is disposed in nearly parallel to the connecting rod of the terminal end of the spool link mechanism and the support section for connecting the spool to the spool control lever is disposed on a plane generally on a level with the support section for connecting the connecting rod to the spool control lever. Therefore, this configuration can slide the spool in a smooth way and with a high degree of certainty because no moment in a twisting direction acts upon the spool control lever for operating the spool upon the sliding action of the connecting rod, thereby enabling a smooth and certain control over the angle of the cam plate. In this respect, too, the operability of the machine body can be improved.

(4) The present invention further provides the hydraulically travelling agricultural machine in which a pair of the spool link mechanisms for interlockingly connecting the pump operating unit to the pair of the variable flow rate control pumps are provided with the connecting rods. The connecting rods are equally long so that the amounts of operation of the pair of the connecting rods can be sustained uniformly upon conducting the steering operation with the steering mechanism and the speed changing operation with the speed changing mechanism, thereby enabling a smooth control of the flow rate of the pair of the variable flow rate control pumps through the connecting rods and enabling a sure acceleration and deceleration of the left-hand and right-hand travelling sections with the hydraulic motors for the left-hand and right-hand travelling sections.

Therefore, the steering operation and the speed changing operation of the machine can be done in a smooth way, thereby improving the operability of the machine.

(5) Moreover, the hydraulically travelling agricultural machine in accordance with the present invention is configured in such a manner that the steering operation is conducted with the circle-shaped steering wheel and the speed changing operation is conducted with the lever for shifting the forward and backward traveling and for adjusting the speed of the machine. Thus, the work requiring a repetition of the forward and backward travelling operations can be done by the operation for shifting the forward and backward travelling operations with the lever for shifting the forward and backward traveling and for adjusting the speed of the machine. Further, the lever for shifting the forward and backward traveling and for adjusting the speed of the machine is provided with a lever regulating member that can hold the lever in its neutral position so that the operator can prevent a mistake in operation by perceiving an operating feeling in the neutral position of the lever.

In addition, the lever regulating member can adjust the scope of the transmission shift of the lever so that the operator can operate the lever for shifting the forward and backward traveling and for adjusting the speed of the machine within an appropriate scope of the operation of changing the speed of the lever in accordance with preferences, thereby improving the operability of the machine.

Furthermore, the lever regulating member is interlockingly coupled to the lever for shifting the forward and backward traveling and for adjusting the speed of the machine and it is disposed along a coupling passage for operating the speed changing mechanism with the lever for shifting the forward and backward traveling and for adjusting the speed of the machine interlockingly coupled with the pump operating unit. This configuration of the lever regulating member can easily permit the work for adjusting the scope of the transmission shift of the lever regulating member and maintenance of the lever regulating member itself, etc.

(6) Still further, the present invention provides the hydraulically travelling agricultural machine in which the output shaft of the engine is interlockingly coupled to the power pickup shaft through the transmission section on which the hydraulic clutch unit and the hydraulic brake device for forcibly stopping the rotation by the inertia of the hydraulic clutch unit are mounted, the pilot oil path for feeding pilot oil is connected to the hydraulic clutch unit and the hydraulic brake device in series, the pilot oil path change-over valve is provided at the intermediate portion of the pilot oil path, the spool is slidably inserted in the valve body of the pilot oil path change-over valve, and the communicating passages communicating with the pilot oil path are provided by cutting away the communicating grooves on the land portion of the spool in the axial direction. In this configuration, a portion of the pilot oil to be fed to the hydraulic clutch unit can be discharged gradually through the communicating passages before the oil path has been switched completely with the land portion of the spool upon switching the pilot oil path change-over valve.

As a consequence, the amount of the pilot oil fed to the hydraulic clutch unit is decreasing by the amount of the pilot oil discharged until the passages are switched thoroughly. Further, as the amount of the oil discharged becomes smaller, the oil to be fed is increased gradually, thereby allowing the hydraulic clutch unit to gradually implement the declutching action.

Then, the amount of the pilot oil to be fed to the hydraulic brake device is being increased gradually, too, thereby allowing the hydraulic brake device to gradually conduct the braking action.

Moreover, when the pilot oil path change-over valve is operated in the way opposite to the above operation, too, the pilot oil is discharged gradually from the hydraulic clutch unit through the communicating passages to thereby allow the hydraulic clutch unit to conduct the clutching action gradually, before the passages are switched thoroughly with the land portion of the spool.

Further, the pilot oil is discharged gradually from the hydraulic brake device through the communicating passages, thereby causing the hydraulic brake device to gradually implement releasing the braking action.

As the pilot oil is allowed to flow through the communicating passages in the manner as described above before the operation for switching the paths with the path change-over valve, the hydraulic clutch unit and the hydraulic brake device can be operated in a smooth fashion and at a good timing, thereby certainly permitting the speed changing operation of the power pickup shaft and for cessation of the rotation thereof (7) The present invention provides the hydraulically travelling agricultural machine in which the throttle part is further provided at the end side portion of the pilot oil path connected to the hydraulic brake device, thereby allowing the flow of the pilot oil in and out from the hydraulic brake device to be delayed. This permits the declutching action and the clutching action of the hydraulic clutch unit to be implemented at a timing with the braking action and the brake releasing action of the hydraulic brake device, thereby allowing the hydraulic clutch unit and the hydraulic brake device to be operated in a smooth fashion and at a good timing.

What is claimed is:

1. A hydraulic travelling agricultural machine, comprising:
   a pair of left-hand and right-hand traveling sections, each of a crawler type;
   a hydraulic motor for each of the left-hand and right-hand traveling sections;
   a pair of variable flow rate control pumps for the respective hydraulic motors operable over a closed circuit oil path, said pair of the variable flow rate control pumps each being provided with a cam plate angle control unit for controlling a cam plate of each of the variable flow rate control pumps, said cam plate angle control unit including a cam plate operating shaft, a servo cylinder connected to the cam plate operating shaft, a spool inserted in the servo cylinder, a spool control lever with its base end portion side connected to the spool and its topside end portion side connected to a spool link mechanism, a support shaft for supporting an intermediate portion of the spool control lever on a machine frame of the variable flow rate control pump, and a connecting rod disposed at an end of the spool link mechanism for connection with the spool, the spool being disposed approximately parallel with the connecting rod disposed at the end of the spool link mechanism;

a support section for connecting the spool to the spool control lever located on a plane generally on a level with a support section for connecting the connecting rod to the spool control lever; and an operation section coupled to the pair of the variable flow rate control pumps, wherein the left-hand and right-hand travelling sections are subjected to a steering operation and a speed change operation by the operation section, the operation section being provided with a pump operating unit, said operation section being coupled to said pair of the variable flow rate control pumps through the spool link mechanism, and the operation section being operable with a steering mechanism and a speed changing mechanism.

2. A hydraulic travelling agricultural machine according to claim 1, wherein said connecting rods are of approximately equal length and said machine further comprises a steering wheel of circular shape disposed above the operation section for operation of said steering mechanism.

3. A hydraulic travelling agricultural machine according to claim 1, wherein said connecting rods are of approximately equal length, the speed changing mechanism includes a lever for shifting forward and backward traveling and adjusting a speed, said lever for shifting forward and backward travelling and adjusting a speed being coupled with a lever regulating member for adjusting a scope of the transmission shift of the lever and for holding the lever at a neutral position, the lever regulating member being provided with a communicating path for operating the speed changing mechanism, and said machine further comprises a steering wheel of circular shape disposed above the operation section for operation of said steering mechanism.

* * * * *